(12) United States Patent
Kato

(10) Patent No.: US 11,338,773 B2
(45) Date of Patent: May 24, 2022

(54) TRANSMISSION CONTROL DEVICE, PORTABLE DEVICE, VEHICLE SYSTEM, TRANSMISSION CONTROL METHOD, CONTROL METHOD, AND CONTROL PROGRAM PRODUCT

(71) Applicant: DENSO CORPORATION, Kariya (JP)

(72) Inventor: Kenji Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/316,521

(22) Filed: May 10, 2021

(65) Prior Publication Data

US 2021/0268992 A1 Sep. 2, 2021

Related U.S. Application Data

(63) Continuation of application No. PCT/JP2019/036537, filed on Sep. 18, 2019.

(30) Foreign Application Priority Data

Nov. 14, 2018 (JP) .............................. JP2018-214068

(51) Int. Cl.
*B60R 25/24* (2013.01)

(52) U.S. Cl.
CPC .......... *B60R 25/245* (2013.01); *B60R 25/241* (2013.01); *B60R 25/246* (2013.01)

(58) Field of Classification Search
CPC .... B60R 25/245; B60R 25/241; B60R 25/246
See application file for complete search history.

(56) References Cited

U.S. PATENT DOCUMENTS 8,310,338 B2 * 11/2012 Hamada ................ B60R 25/245
340/5.64
9,802,573 B2 * 10/2017 Nishiyama .............. B60R 25/24
(Continued)

FOREIGN PATENT DOCUMENTS

| JP | 2015045183 A | 3/2015 |
|---|---|---|
| JP | 2015072162 A | 4/2015 |
| JP | 2016007896 A | 1/2016 |

OTHER PUBLICATIONS

U.S. Appl. No. 17/316,462, filed May 10, 2021, Kato.

*Primary Examiner* — Thomas D Alunkal
(74) *Attorney, Agent, or Firm* — Harness, Dickey & Pierce, P.L.C.

(57) ABSTRACT

A transmission control device that drives multiple antennas having different transmission ranges controls a genuine transmission antenna among the multiple antennas to transmit, with use of a carrier wave, a genuine code for activating a portable device and a noise determination purpose burst signal for determining a noise in the portable device after the transmission of the genuine code, and controls each antenna of a remaining antenna group, which includes remaining antennas except the genuine transmission antenna, to transmit the noise determination purpose burst signal at a transmission time point, which is set different from one another and shifted from a transmission time point of the noise determination purpose burst signal from the genuine transmission antenna. The transmission ranges of the multiple antennas including the genuine transmission antenna are set to not have a common area.

11 Claims, 8 Drawing Sheets

(56) References Cited

U.S. PATENT DOCUMENTS

| | | | |
|---|---|---|---|
| 10,000,187 B2* | 6/2018 | Hamada | B60R 25/245 |
| 2004/0085189 A1* | 5/2004 | Nagai | B60R 25/2072 |
| | | | 340/5.72 |
| 2006/0091997 A1* | 5/2006 | Conner | B60R 25/1003 |
| | | | 340/5.64 |
| 2016/0205498 A1* | 7/2016 | Takigawa | H01Q 1/32 |
| | | | 455/41.2 |
| 2017/0120868 A1* | 5/2017 | Watanabe | E05B 81/56 |
| 2019/0054897 A1* | 2/2019 | Naitou | B60R 25/24 |

* cited by examiner

TRANSMISSION CONTROL DEVICE, PORTABLE DEVICE, VEHICLE SYSTEM, TRANSMISSION CONTROL METHOD, CONTROL METHOD, AND CONTROL PROGRAM PRODUCT

CROSS REFERENCE TO RELATED APPLICATION

The present application is a continuation application of International Patent Application No. PCT/JP2019/036537 filed on Sep. 18, 2019, which designated the U.S. and claims the benefit of priority from Japanese Patent Application No. 2018-214068, filed on Nov. 14, 2018. The entire disclosures of all of the above applications are incorporated herein by reference.

TECHNICAL FIELD

The present disclosure relates to a transmission control device, a portable device, a vehicle system, a transmission control method, a control method, and control program products each of which drives multiple antennas to identify two or more spatial regions using carrier waves transmitted from the antennas.

BACKGROUND

There has been known an authentication system that permits control of a vehicle in response to success of code verification between the vehicle and a portable device.

SUMMARY

A transmission control device that drives multiple antennas having different transmission ranges controls a genuine transmission antenna among the multiple antennas to transmit, with use of a carrier wave, a genuine code for activating a portable device and a noise determination purpose burst signal for determining a noise in the portable device after the transmission of the genuine code, and controls each antenna of a remaining antenna group, which includes remaining antennas except the genuine transmission antenna, to transmit the noise determination purpose burst signal at a transmission time point, which is set different from one another and shifted from a transmission time point of the noise determination purpose burst signal from the genuine transmission antenna. The transmission ranges of the multiple antennas including the genuine transmission antenna are set to not have a common area.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
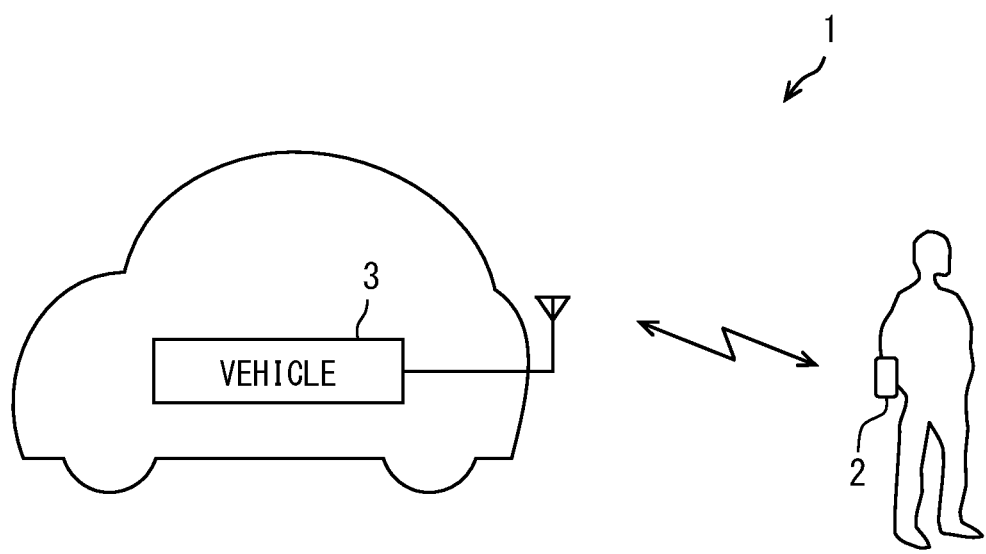
FIG. 1 is a diagram showing an example of a schematic configuration of a vehicle system.

Before describing embodiments of the present disclosure, a known authentication system will be described.

There has been known an authentication system that permits control of a vehicle in response to success of code verification which uses data transmitted and received via wireless communication between the vehicle and a portable device. In such an authentication system, a position of the portable device relative to the vehicle is detected by individually driving multiple antennas, which are arranged at respective positions of the vehicle and have different communication ranges with one another. Then, the authentication system performs a control according to the position of the portable device relative to the vehicle.

The position of the portable device may be erroneously detected due to crosstalk of the driven antenna. For example, when the antenna in a vehicle compartment is driven, an antenna drive current may also be superimposed on an antenna outside the vehicle compartment due to the crosstalk, and the data for code verification may be transmitted to an immediate vicinity of the antenna outside the vehicle compartment. In this case, although the portable device is positioned outside the vehicle compartment, code verification with the portable device may succeed when the antenna in the vehicle compartment is driven, and the position of the portable device may be erroneously detected as the inside of the vehicle compartment.

For example, there has been known a technique that attempts to prevent erroneous detection of the position of the portable device due to crosstalk of a driven antenna. In this technique, together with a call signal for calling the portable device, a first burst is transmitted from a first antenna and a second burst is transmitted from a second antenna following the first burst. The portable device detects received signal strengths of the first burst and the second burst, and the position of the portable device is determined based on one of the detected received signal strengths which is larger than a predetermined threshold value.

The technique described above attempts to prevent erroneous detection of the position of the portable device caused by crosstalk of the driven antenna. However, the technique described above does not consider radiation noise generated by a transmission control device which is an electronic control device for controlling driving of the multiple antennas. Radiation noise generated by the transmission control device is limited to an immediate vicinity of the transmission control device. In a case where the portable device is located extremely close to the transmission control device, the radiation noise generated by the transmission control device for driving the antenna positioned outside the vehicle compartment is received by the portable device located inside the vehicle compartment. Thus, the portable device is erroneously determined to be positioned outside the vehicle compartment although the portable device is actually positioned inside the vehicle compartment. Further, when the antenna current is increased in order to enable position detection of the portable device at a relatively long distance from the vehicle, the radiation noise generated by the transmission control device also tends to increase, and above-described erroneous position detection of the portable device becomes more remarkable.

According to an aspect of the present disclosure, a transmission control device is provided. The transmission control device is mounted on a vehicle and drives a plurality of antennas to detect a position of a portable device relative to the vehicle using a wireless communication between the portable device and the plurality of antennas. The plurality of antennas are arranged at respective positions of the vehicle to have different transmission ranges from one another, and the portable device is carried by a user. The transmission control device includes: a first transmission control unit configured to control a genuine transmission antenna to transmit, with use of a carrier wave, a genuine code that activates the portable device and a noise determination purpose burst signal following the genuine code, and the genuine transmission antenna being one of the plurality of antennas and the portable device using the noise determination purpose burst signal to determine a noise; and a second transmission control unit configured to control each antenna of a remaining antenna group, which includes remaining antennas of the plurality of antennas except the genuine transmission antenna, to transmit the noise determination purpose burst signal at a transmission time point, which is set different from one another and shifted from a transmission time point of the noise determination purpose burst signal from the genuine transmission antenna, and the transmission ranges of the plurality of antennas which include the genuine transmission antenna being set to not have a common area.

According to another aspect of the present disclosure, a transmission control method executed by a transmission control device is provided. The transmission control device is mounted on a vehicle and drives a plurality of antennas to detect a position of a portable device relative to the vehicle using a wireless communication between the portable device and the plurality of antennas. The plurality of antennas are arranged at respective positions of the vehicle to have different transmission ranges from one another, and the portable device is carried by a user. The transmission control method includes: controlling a genuine transmission antenna to transmit, with use of a carrier wave, a genuine code that activates the portable device and a noise determination purpose burst signal following the genuine code, and the genuine transmission antenna being one of the plurality of antennas and the portable device using the noise determination purpose burst signal to determine a noise; and controlling each antenna of a remaining antenna group, which includes remaining antennas of the plurality of antennas except the genuine transmission antenna, to transmit the noise determination purpose burst signal at a transmission time point, which is set different from one another and shifted from a transmission time point of the noise determination purpose burst signal from the genuine transmission antenna, and the transmission ranges of the plurality of antennas which include the genuine transmission antenna being set to not have a common area.

According to another aspect of the present disclosure, a first control program product controlling a computer to be implemented as a transmission control device is provided. The transmission control device is mounted on a vehicle and drives a plurality of antennas to detect a position of a portable device relative to the vehicle using a wireless communication between the portable device and the plurality of antennas. The plurality of antennas are arranged at respective positions of the vehicle to have different transmission ranges from one another, and the portable device is carried by a user. The first control program product includes instructions that control the transmission control device to function as: a first transmission control unit configured to control a genuine transmission antenna to transmit, with use of a carrier wave, a genuine code that activates the portable device and a noise determination purpose burst signal following the genuine code, and the genuine transmission antenna being one of the plurality of antennas and the portable device using the noise determination purpose burst signal to determine a noise; and a second transmission control unit configured to control each antenna of a remaining antenna group, which includes remaining antennas of the plurality of antennas except the genuine transmission antenna, to transmit the noise determination purpose burst signal at a transmission time point, which is set different from one another and shifted from a transmission time point of the noise determination purpose burst signal from the genuine transmission antenna, and the transmission ranges of the plurality of antennas which include the genuine transmission antenna being set to not have a common area.

According to the above configuration of the present disclosure, the genuine code and the noise determination purpose burst signal following the genuine code are transmitted toward the transmission range of the genuine transmission antenna. The noise determination purpose burst signal is also transmitted toward the transmission range of each antennal included in the remaining antenna group at a different transmission time point from one another. The transmission time point of the noise determination purpose burst signal from each antenna included in the remaining antenna group is shifted from the transmission time point of the noise determination purpose burst signal from the genuine transmission antenna. The remaining antenna group includes the remaining antennas except the genuine transmission antenna. The transmission ranges of all of the antennas are set to not have a common area. Thus, in a case where the portable device receives the genuine code within the transmission range of the genuine transmission antenna, the portable device cannot receive, together with the noise determination purpose burst signal transmitted from the genuine transmission antenna, the noise determination purpose burst signal transmitted from each antenna of the remaining antenna group. The transmission control device drives both of the genuine transmission antenna and the remaining antenna group. When the portable device exists at a position where the radiation noises radiated from the transmission control device caused by transmission of the noise determination purpose burst signals from the genuine transmission and the remaining antenna group are received, the portable device receives all of the radiation noises corresponding to the noise determination purpose burst signal transmitted from the genuine transmission antenna and the noise determination purpose burst signal transmitted from each antenna of the remaining antenna group. The transmission time point of the noise determination purpose burst signal transmitted from the genuine transmission antenna and the transmission time point of the noise determination purpose burst signal transmitted from each antenna of the remaining antenna group are shifted from one another. Thus, the portable device is able to determine whether the noise determination purpose burst signals transmitted from all of the antennas are received with a simple configuration.

With the above configuration, in a case where the portable device receives the radiation noise radiated from the transmission control device, a pattern of the noise determination purpose burst signals transmitted from the genuine transmission antenna and the remaining antenna group is different from a pattern of the received noise determination purpose burst signals in a case where the portable device does not receive the radiation noise. In response to determining that the pattern of the noise determination purpose burst signals received after the genuine code is the same as the pattern of the noise determination purpose burst signals received in a case where the portable device receives the radiation noise, a transmission of the response signal that enables a position detection of the portable device relative to the vehicle is forbidden. The position of the portable device may be erroneously detected caused by the genuine code radiation noise of the genuine code radiated from the transmission control device that drives the genuine transmission antenna. With the configuration of the present disclosure, the erroneous detection of the position of the portable device can be prevented. The position of the portable device relative to the vehicle is detected with use of a carrier wave transmitted from antennas mounted on the vehicle. With the configuration of the present disclosure, an erroneous detection of the position of the portable device caused by the radiation noise radiated from the transmission control device that drives the antennas can be prevented.

According to another aspect of the present disclosure, a portable device is provided. The portable device is carried by a user and includes: a portable device reception unit driven by a transmission control device mounted on a vehicle and receiving signals, which are transmitted from a plurality of antennas arranged at respective positions of the vehicle to have different transmission ranges from one another, via a wireless communication with use of a carrier wave within the transmission ranges of the plurality of antennas; a portable device transmission control unit configured to transmit a response signal that includes information enabling a detection of a position of the portable device relative to the vehicle in response to the portable device reception unit receiving a genuine code that activates the portable device; and a portable device determination unit configured to determine (i) whether the genuine code and a noise determination purpose burst signal following the genuine code, which are transmitted from a genuine transmission antenna, are received, and (ii) whether the noise determination purpose burst signal, which is transmitted from each antenna of a remaining antenna group, is received at a transmission time point, which is set different from one another and shifted from a transmission time point of the noise determination purpose burst signal transmitted from the genuine transmission antenna. The genuine transmission antenna is one of the plurality of antennas and the remaining antenna group includes remaining antennas of the plurality of antennas except the genuine transmission antenna. The transmission ranges of the plurality of antennas including the genuine transmission antenna are set to not have a common area. The noise determination purpose burst signal is used to determine a noise in the portable device. The portable device determination unit controls the portable device transmission control unit to transmit the response signal in response to the portable device reception unit receiving the genuine code in a case where the noise determination purpose burst signals transmitted from partial of the plurality of antennas are received. The portable device determination unit forbids a transmission of the response signal although the portable device reception unit has received the genuine code in a case where the noise determination purpose burst signals transmitted from all of the plurality of antennas are received.

According to another aspect of the present disclosure, a control method executed by a portable device, which is carried by a user, is provided. The control method includes: determining (i) whether a genuine code and a noise determination purpose burst signal following the genuine code, which are transmitted from a genuine transmission antenna, are received, and (ii) whether the noise determination purpose burst signal, which is transmitted from each antenna of a remaining antenna group, is received at a transmission time point, which is set different from one another and shifted from a transmission time point of the noise determination purpose burst signal transmitted from the genuine transmission antenna, the genuine transmission antenna being one of a plurality of antennas arranged at respective positions of a vehicle, the plurality of antennas being driven by a transmission control device mounted on the vehicle to have transmission ranges different from one another, the remaining antenna group including remaining antennas of the plurality of antennas except the genuine transmission antenna, the transmission ranges of the plurality of antennas which include the genuine transmission antenna being set to not have a common area, and the genuine code being used to activate the portable device and the noise determination purpose burst signal being used to determine a noise in the portable device; transmitting a response signal that includes information enabling a detection of a position of the portable device relative to the vehicle in response to a reception of the genuine code in a case where the noise determination purpose burst signals transmitted from partial of the plurality of antennas are received; and forbidding a transmission of the response signal although the portable device has received the genuine code in a case where the noise determination purpose burst signals transmitted from all of the plurality of antennas are received.

According to another aspect of the present disclosure, a second control program product includes instructions that control a computer to be implemented as: a portable device determination unit of a portable device, the portable device determination unit determining (i) whether a genuine code and a noise determination purpose burst signal following the genuine code, which are transmitted from a genuine transmission antenna, are received, and (ii) whether the noise determination purpose burst signal, which is transmitted from each antenna of a remaining antenna group, is received at a transmission time point, which is set different from one another and shifted from a transmission time point of the noise determination purpose burst signal transmitted from the genuine transmission antenna, the genuine transmission antenna being one of a plurality of antennas arranged at respective positions of a vehicle, the plurality of antennas being driven by a transmission control device mounted on the vehicle to have different transmission ranges from one another, the remaining antenna group including remaining antennas of the plurality of antennas except the genuine transmission antenna, the transmission ranges of the plurality of antennas which include the genuine transmission antenna being set to not have a common area, and the genuine code being used to activate the portable device and the noise determination purpose burst signal being used to determine a noise in the portable device; and a portable device transmission control unit of the portable device, the portable device transmission control unit being configured to transmit a response signal that includes information enabling a detection of a position of the portable device relative to the vehicle in response to a reception of the genuine code in a case where the noise determination purpose burst signals transmitted from partial of the plurality of antennas are received, and the portable device transmission control unit further being configured to forbid a transmission of the response signal although the portable device has received the genuine code in a case where the noise determination purpose burst signals transmitted from all of the plurality of antennas are received.

According to the above configuration of the present disclosure, the genuine code and the noise determination purpose burst signal following the genuine code are transmitted toward the transmission range of the genuine transmission antenna. The noise determination purpose burst signal is also transmitted toward the transmission range of each antennal included in the remaining antenna group at a different transmission time point from one another. The transmission time point of the noise determination purpose burst signal from each antenna included in the remaining antenna group is shifted from the transmission time point of the noise determination purpose burst signal from the genuine transmission antenna. The remaining antenna group includes the remaining antennas except the genuine transmission antenna. The transmission ranges of all of the antennas are set to not have a common area. Thus, in a case where the portable device receives the genuine code within the transmission range of the genuine transmission antenna, the portable device cannot receive, together with the noise determination purpose burst signal transmitted from the genuine transmission antenna, the noise determination purpose burst signal transmitted from each antenna of the remaining antenna group. The transmission control device drives both of the genuine transmission antenna and the remaining antenna group. When the portable device exists at a position where the radiation noises radiated from the transmission control device caused by transmission of the noise determination purpose burst signals from the genuine transmission and the remaining antenna group are received, the portable device receives all of the radiation noises corresponding to the noise determination purpose burst signal transmitted from the genuine transmission antenna and the noise determination purpose burst signal transmitted from each antenna of the remaining antenna group. The transmission time point of the noise determination purpose burst signal transmitted from the genuine transmission antenna and the transmission time point of the noise determination purpose burst signal transmitted from each antenna of the remaining antenna group are shifted from one another. Thus, the portable device is able to determine whether the noise determination purpose burst signals transmitted from all of the antennas are received with a simple configuration.

When the portable device receives the radiation noise radiated from the transmission control device, the pattern of the noise determination purpose burst signals is different from the pattern of the noise determination purpose burst signals in a case where the radiation noise is not received. When the portable device determines that not all of the noise determination purpose burst signals are received, the response signal is transmitted in response to the genuine code. Thus, when the portable device receives the genuine code within the transmission range of the genuine transmission antenna, the portable device can transmit the response signal to enable the position detection of the portable device. When the portable device determines that all of the noise determination purpose burst signals are received, the response signal is not transmitted in response to the genuine code. Thus, when the portable device receives the radiation noise, the portable device can forbid transmission of the response signal to suppress an erroneous detection of the portable device. The position of the portable device relative to the vehicle is detected with use of a carrier wave transmitted from antennas mounted on the vehicle. With the configuration of the present disclosure, an erroneous detection of the position of the portable device caused by the radiation noise radiated from the transmission control device that drives the antennas can be prevented.

According to another aspect of the present disclosure, a vehicle system includes: a portable device carried by a user; and a transmission control device, which is mounted on a vehicle and drives a plurality of antennas to detect a position of the portable device relative to the vehicle using a wireless communication between the portable device and the plurality of antennas, the plurality of antennas being arranged at respective positions of the vehicle to have different transmission ranges from one another. The transmission control device includes: a first transmission control unit configured to control a genuine transmission antenna to transmit, with use of a carrier wave, a genuine code that activates the portable device and a noise determination purpose burst signal following the genuine code, and the genuine transmission antenna being one of the plurality of antennas and the portable device using the noise determination purpose burst signal to determine a noise; and a second transmission control unit configured to control each antenna of a remaining antenna group, which includes remaining antennas of the plurality of antennas except the genuine transmission antenna, to transmit the noise determination purpose burst signal at a transmission time point, which is set different from one another and shifted from a transmission time point of the noise determination purpose burst signal from the genuine transmission antenna, and the transmission ranges of the plurality of antennas which include the genuine transmission antenna being set to not have a common area. The portable device includes: a portable device reception unit configured to receive signals transmitted from the plurality of antennas, via the wireless communication with use of the carrier wave, within the transmission ranges of the plurality of antennas; a portable device transmission control unit configured to transmit a response signal that includes information enabling a detection of the position of the portable device relative to the vehicle in response to the portable device reception unit receiving the genuine code; and a portable device determination unit configured to determine (i) whether the genuine code and the noise determination purpose burst signal following the genuine code, which are transmitted from the genuine transmission antenna, are received, and (ii) whether the noise determination purpose burst signal, which is transmitted from each antenna of the remaining antenna group, is received at the transmission time point, which is set different from one another and shifted from the transmission time point of the noise determination purpose burst signal transmitted from the genuine transmission antenna. The portable device determination unit controls the portable device transmission control unit to transmit the response signal in response to the portable device reception unit receiving the genuine code in a case where the noise determination purpose burst signals transmitted from partial of the plurality of antennas are received. The portable device determination unit forbids a transmission of the response signal although the portable device reception unit has received the genuine code in a case where the noise determination purpose burst signals transmitted from all of the plurality of antennas are received.

According to the above configuration of the present disclosure, the genuine code and the noise determination purpose burst signal following the genuine code are transmitted toward the transmission range of the genuine transmission antenna. The noise determination purpose burst signal is also transmitted toward the transmission range of each antennal included in the remaining antenna group at a different transmission time point from one another. The transmission time point of the noise determination purpose burst signal from each antenna included in the remaining antenna group is shifted from the transmission time point of the noise determination purpose burst signal from the genuine transmission antenna. The remaining antenna group includes the remaining antennas except the genuine transmission antenna. The transmission ranges of all of the antennas are set to not have a common area. Thus, in a case where the portable device receives the genuine code within the transmission range of the genuine transmission antenna, the portable device cannot receive, together with the noise determination purpose burst signal transmitted from the genuine transmission antenna, the noise determination purpose burst signal transmitted from each antenna of the remaining antenna group. The transmission control device drives both of the genuine transmission antenna and the remaining antenna group. When the portable device exists at a position where the radiation noises radiated from the transmission control device caused by transmission of the noise determination purpose burst signals from the genuine transmission and the remaining antenna group are received, the portable device receives all of the radiation noises corresponding to the noise determination purpose burst signal transmitted from the genuine transmission antenna and the noise determination purpose burst signal transmitted from each antenna of the remaining antenna group. The transmission time point of the noise determination purpose burst signal transmitted from the genuine transmission antenna and the transmission time point of the noise determination purpose burst signal transmitted from each antenna of the remaining antenna group are shifted from one another. Thus, the portable device is able to determine whether the noise determination purpose burst signals transmitted from all of the antennas are received with a simple configuration.

With the above configuration, in a case where the portable device receives the radiation noise radiated from the transmission control device, a pattern of the noise determination purpose burst signals transmitted from the genuine transmission antenna and the remaining antenna group is different from a pattern of the received noise determination purpose burst signals in a case where the portable device does not receive the radiation noise. When the portable device determines that not all of the noise determination purpose burst signals are received, the response signal is transmitted in response to the genuine code. Thus, when the portable device receives the genuine code within the transmission range of the genuine transmission antenna, the portable device can transmit the response signal to enable a position detection of the portable device. When the portable device determines that all of the noise determination purpose burst signals are received, the response signal is not transmitted in response to the genuine code. Thus, when the portable device receives the radiation noise, the portable device can forbid transmission of the response signal to suppress an erroneous detection of the portable device. The position of the portable device relative to the vehicle is detected with use of a carrier wave transmitted from antennas mounted on the vehicle. With the configuration of the present disclosure, an erroneous detection of the position of the portable device caused by the radiation noise radiated from the transmission control device that drives the antennas can be prevented.

The following will describe embodiments of the present disclosure with reference to the accompanying drawings. For convenience of description, the same reference symbols are assigned to portions having the same functions as those illustrated in the drawings used in the description of embodiments, and a description of the same portion may be omitted. The description of other embodiments may be referred to with respect to these portions given the same reference symbols.

First Embodiment (Schematic Configuration of Vehicle System 1)

The following will describe a first embodiment of the present disclosure with reference to the accompanying drawings. A vehicle system 1 shown in FIG. 1 includes a portable device 2 carried by a user and a vehicle unit 3 equipped to a vehicle.

The vehicle system 1 has well-known smart function. The smart function is known as an authentication function which authenticates a portable device 2 by performing a verification between the portable device 2 and the vehicle unit 3 via wireless communication, and enables control of the vehicle as an authenticated target in response to the authentication being succeeded. Examples of vehicle control enabled by the authentication may include locking or unlocking of doors, start of a vehicle driving source, activation of convenient functions such as turning on a welcome light. The convenience function may refer to a function that improves the convenience and satisfaction of a user who uses the vehicle. For example, the convenient functions may include turning on position lamps as the welcome light and automatic air conditioning operation.

(Schematic Configuration of Vehicle Unit 3)

Figure 2:
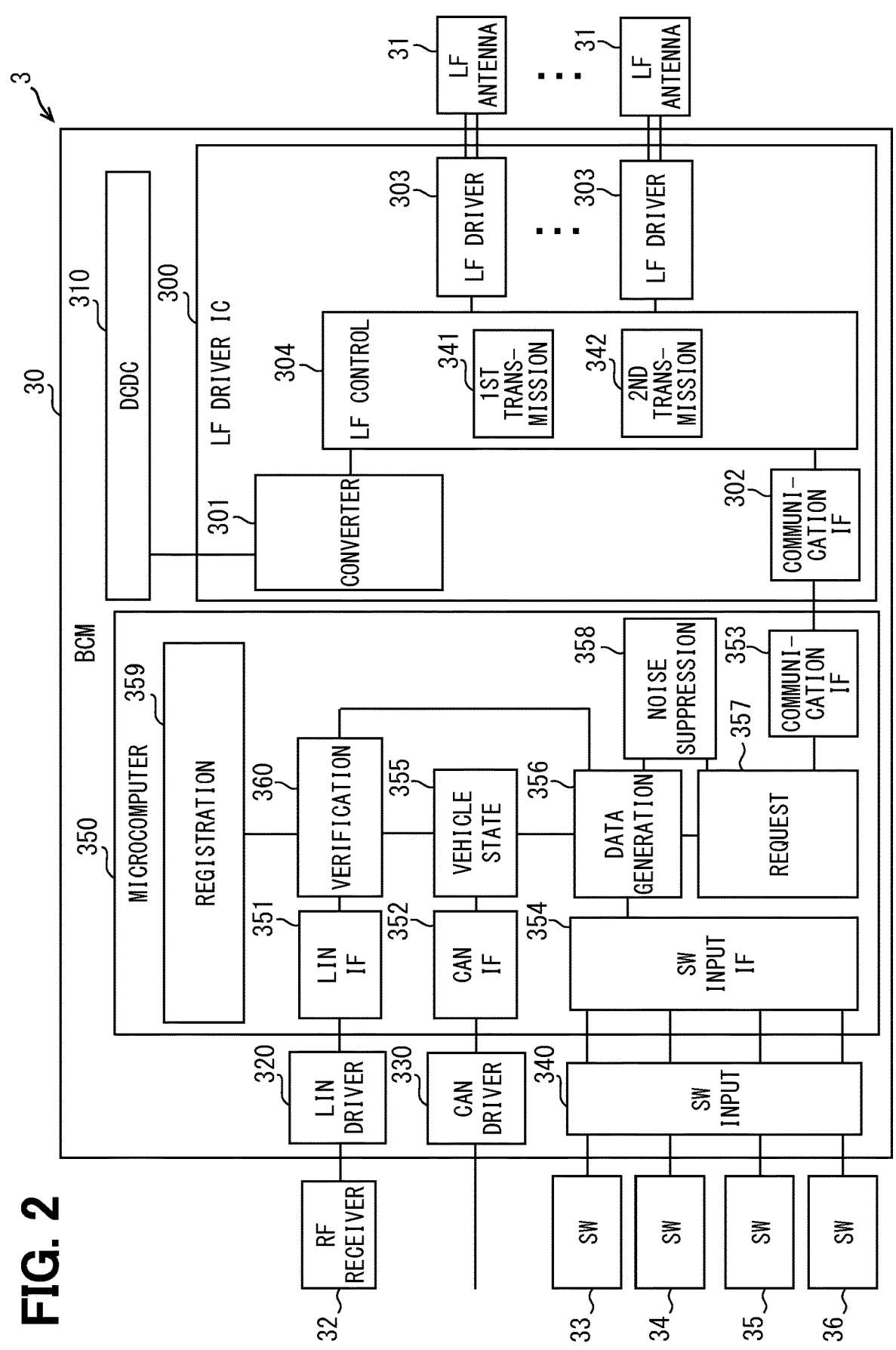
FIG. 2 is a diagram showing an example of a schematic configuration of a vehicle unit and a BCM.

The following will describe an example of a schematic configuration of the vehicle unit 3 with reference to FIG. 2. As shown in FIG. 2, the vehicle unit 3 includes a body control Module (BCM) 30, LF antennas 31, an RF receiver 32, a D seat door handle switch (hereinafter referred to as SW) 33, a P seat door handle SW 34, a rear bumper SW 35, and a push SW 36.

The LF antennas 31 transmit signals via radio waves (also known as carrier waves) having LF (Low Frequency) band. The LF band is defined as a low frequency band of, for example, from 30 kHz to 300 kHz. The signal transmitted from the LF antenna 31 includes a request signal requesting a response from the portable device 2. The request signal may be a signal including a Wakeup ID which is a code for switching the portable device 2 from a sleep state to a wakeup state. The Wakeup ID may also be referred to as a code for activating the portable device 2. This Wakeup ID corresponds to a genuine code. The request signal may be a signal including a random number code. The signal including the random number code may be used in an encrypted communication that requests a transmission of the code for verification. Both of the signal including Wakeup ID and the signal including the random number code may be individually used as the request signal. Alternatively, a signal including both of the Wakeup ID and the random number code may be used as the request signal.

The vehicle may be equipped with multiple LF antennas 31. For example, the LF antenna 31 may include outside antennas disposed outside the vehicle compartment and inside antennas disposed inside the vehicle compartment.

For example, the outside antennas may include a D seat antenna 31D disposed in the vicinity of a driver's seat (referred to as D seat) door, a P seat antenna 31P disposed in the vicinity of a passenger seat (referred to as P seat) door, and a rear bumper antenna 31R disposed in the vicinity of a rear bumper. For example, the inside antennas may include an instrument panel antenna 31I disposed in the vicinity of an instrument panel, a center console antenna 31C disposed in the vicinity of a center console, and a trunk antenna 31T disposed in a trunk room. Hereinafter, in a case where it is not necessary to distinguish above-described antennas, these antennas are collectively referred to as LF antenna(s) 31.

In a case where the vehicle body is made of metal, the radio waves having LF band are blocked by the vehicle body. Thus, a transmission range of the radio wave having LF band transmitted from the outside antenna among the LF antennas 31 is difficult to reach inside of the vehicle compartment. The transmission range of the LF band radio wave transmitted from the inside antenna among the LF antennas 31 is difficult to reach outside of the vehicle compartment. The following will describe an example of transmission ranges of the D seat antenna 31D, the P seat antenna 31P, the rear bumper antenna 31R, the instrument panel antenna 31I, the center console antenna 31C, and the trunk antenna 31T with reference to FIG. 3. In this example, the driver's seat is disposed on a right side of the vehicle. When the driver's seat is disposed on a left side of the vehicle, correspondingly, the D seat antenna 31D is arranged on the left side of the vehicle, the P seat antenna 31P is arranged on the right side of the vehicle, and the description regarding left and right should be understood in reversed way.

Figure 3:
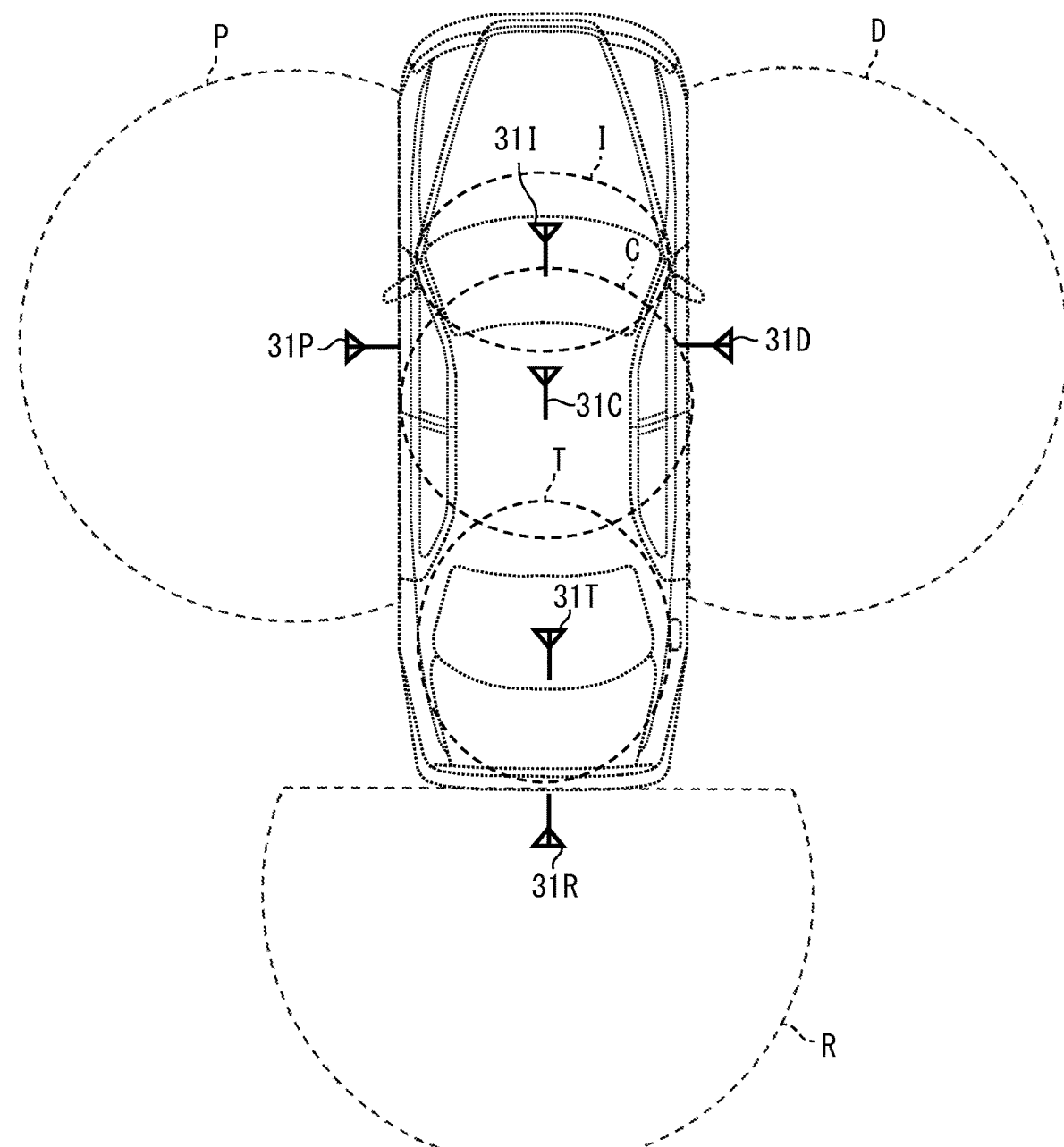
FIG. 3 is a diagram showing an example of transmission ranges of multiple LF antennas.

As shown in FIG. 3, the transmission range D of the D seat antenna 31D extends toward the right side of the driver's seat door in an area outside of the vehicle compartment. The transmission range P of the P seat antenna 31P extends toward the left side of the driver's seat door in the area outside of the vehicle compartment. The transmission range R of the rear bumper antenna 31R extends toward a rear side of the rear bumper in the area outside of the vehicle compartment. The transmission ranges D, P, and R are set so that they do not overlap with one another. As an example, by adjusting the transmission output powers of the LF antennas 31, the transmission ranges D, P, and R are set so as not to overlap with one another.

As shown in FIG. 3, the transmission range I of the instrument panel antenna 31I extends toward a front side of the vehicle compartment in the vehicle compartment. The transmission range C of the center console antenna 31C covers a center of the vehicle compartment in the vehicle compartment. The transmission range I of the trunk antenna 31T extends toward a rear side of the vehicle compartment in the vehicle compartment. The transmission range I and the transmission range C overlap with one another, and the transmission range C and the transmission range T overlap with one another. The transmission ranges I, C, and T of the inside antennas are set so as not to overlap with the transmission ranges D, P, and R of the outside antennas. As an example, the positions of the LF antennas 31 may be arranged inside and outside of the vehicle compartment so that the transmission ranges of the inside antennas do not overlap with the transmission ranges of the outside antennas. Alternatively, the transmission output powers of the LF antennas 31 may be adjusted so that the transmission ranges of the inside antennas do not overlap with the transmission ranges of the outside antennas. The LF antennas 31 are disposed such that the transmission ranges of the D seat antenna 31D, the P seat antenna 31P, the rear bumper antenna 31R, the instrument panel antenna 31I, the center console antenna 31C, and the trunk antenna 31T do not have a common overlapped area.

The RF receiver 32 receives the response signal transmitted from the portable device 2 on the radio wave of the RF band. For example, the RF band may be defined as a frequency band of 300 Hz to 3 THz. In the present embodiment, the following description is made under a condition that the response signal is transmitted by the radio waves of the UHF (Ultra High Frequency) band within the RF band. For example, the UHF band may be defined as a frequency band of 300 MHz to 3 GHz.

It is assumed that the response signal includes, for example, threshold value determination information. The threshold value determination information indicates whether received signal strength indicator (hereinafter referred to as RSSI) of a burst signal for measurement purpose (hereinafter referred to as a measurement purpose burst signal), which is measured by the portable device 2, is within a threshold value range. The measurement purpose burst signal is transmitted from the LF antenna 31, and RSSI measurement is usually carried out for detecting a relay attack. The threshold value is a value for distinguishing the RSSI of the signal in a case of relay attack from the RSSI of a genuine signal, and is set to be a value so that the RSSI of signal in a case of relay attack is out of the threshold range. The relay attack is a method of code verification by indirectly establishing a communication between the portable device 2 and the BCM 30 using one or more relay devices. Further, in response to the received request signal, which is transmitted from the LF antenna 31 and includes the random number code, the portable device 2 encrypts the random number code with a secret key and an encryption algorithm of a public key cryptography method. When the request signal transmitted from the LF antenna 31 does not include the random number code, the response signal in response to the request signal does not include the encrypted code.

The D seat door handle SW 33 is disposed on an outer door handle of the driver's seat of the vehicle. The P seat door handle SW 34 is disposed on an outer door handle of the passenger seat of the vehicle. The rear bumper SW 35 is disposed on the rear bumper of the vehicle. The push SW 36 is disposed in a front area of the driver's seat, and receives a start operation of driving source of the vehicle.

The BCM 30 includes a processor, an IC, a memory, an I/O, and a bus connecting these devices, and executes a control program stored in the memory, as a program product, to perform various processes, such as a process of vehicle related authentication and a process related to transmission control of signal from the LF antenna 31 (hereinafter referred to as a transmission control related processes). Execution of the control program by the processor corresponds to execution of a method corresponding to the control program. The memory mentioned in the above is a non-transitory tangible storage medium that stores non-transitorily computer-readable programs and data. The non-transitory tangible storage medium may be provided by a semiconductor memory or a magnetic disk.

(Schematic Configuration of BCM 30)

The following will describe an example of a schematic configuration of the BCM 30 with reference to FIG. 2. As shown in FIG. 2, the BCM 30 includes an LF driver IC 300, a DCDC circuit 310, a LIN driver 320, a CAN (registered trademark) driver 330, a SW input circuit 340, and a microcomputer 350.

The BCM 30 is connected to a CAN bus, which is a transmission path for performing communication using CAN as a communication protocol. The BCM 30 is also connected to a LIN bus, which is a transmission path for performing communication using LIN as a communication protocol. The BCM 30 exchanges information with another electronic control device, such as a power unit ECU that controls the driving source of the vehicle using the CAN bus as the transmission path. The BCM 30 exchanges information with an actuator, such as a door lock motor, a vehicle light, the RF receiver 32, or the like using the LIN bus as the transmission path.

The DCDC circuit 310 inputs a DC voltage to the LF driver IC 300. The LIN driver 320 outputs information to the LIN bus or acquires, from the LIN bus, the information output to the LIN bus. The LIN driver 320 acquires, from the RF receiver 32, a code of the response signal acquired by the RF receiver 32. The LIN driver 320 outputs the acquired information to the microcomputer 350. The LIN driver 320 outputs, to the door lock motor, a drive signal output from the microcomputer 350 for controlling locking and unlocking of the vehicle door.

The CAN driver 330 outputs information to the CAN bus or acquires, from the CAN bus, information output to the CAN bus. The CAN driver 330 outputs, to the power unit ECU, a start permission signal output from the microcomputer 350. The CAN driver 330 acquires a sensing result indicating a vehicle state such as a vehicle speed output from another ECU, and outputs the sensing result to the microcomputer 350.

The SW input circuit 340 receives the signals transmitted from the D seat door handle SW 33, the P seat door handle SW 34, the rear bumper SW 35, and the push SW 36, and outputs the received signals to the microcomputer 350. It is assumed that the SW input circuit 340 also inputs a signal such as a door courtesy switch for detecting an opening or closing of the door.

As shown in FIG. 2, the microcomputer 350 includes a LIN interface (hereinafter referred to as IF) 351, a CAN IF 352, a microcomputer communication IF 353, a SW input IF 354, a vehicle state determination unit 355, a communication data generation unit 356, a request unit 357, a noise suppression control unit 358, a registration unit 359, and a verification unit 360 as functional blocks.

The LIN IF 351 performs a communication between the LIN driver 320 and the microcomputer 350. The CAN IF 352 performs a communication between the CAN driver 330 and the microcomputer 350. The microcomputer communication IF 353 performs a serial communication between the microcomputer 350 and the LF driver IC 300. The SW input IF 354 performs a communication between the SW input circuit 340 and the microcomputer 350.

The vehicle state determination unit 355 determines the state of the vehicle based on the sensing result related to the vehicle state acquired from the CAN driver 330 via the CAN IF 352. For example, the vehicle state determination unit 355 determines whether the vehicle is in a parked state based on a vehicle speed detected by a vehicle speed sensor, a shift position detected by a shift position sensor, a signal from a parking brake switch, or the like.

The communication data generation unit 356 generates data of the signal to be transmitted from the LF antenna 31 according to the signal acquired via the SW input circuit 340, the vehicle state determined by the vehicle state determination unit 355, and the lock/unlock state of the vehicle door. For example, in a case (hereinafter referred to as a welcome scene) where the vehicle state determination unit 355 determines that (i) the vehicle is in parked state, (ii) the vehicle door is locked after the vehicle door is opened and closed, and (iii) a signal indicating an operation of an outside switch of the vehicle compartment (hereinafter referred to as outside SW), such as the D seat door handle SW 33, the P seat door handle SW 34, the rear bumper SW 35, or the push SW 36 is not inputted, the communication data generation unit 356 generates the request signal data which includes the Wakeup ID but not include the random number code.

In a case (hereinafter referred to as an unlocking scene) where the vehicle state determination unit 355 determines that (i) the vehicle is in the parked state, (ii) the vehicle door is in locked state, and (iii) the signal indicating an operation of one of the outside SWs is inputted, the communication data generation unit 356 generates the request signal data to include both of the Wakeup ID and the random number code. In a case (hereinafter referred to as a locking scene) where the vehicle state determination unit 355 determines that (i) the vehicle is in the parked state, (ii) the vehicle door is locked after the vehicle door is opened and closed, and (iii) the signal indicating an operation of one of the outside SWs is inputted, the communication data generation unit 356 generates the request signal data to include both of the Wakeup ID and the random number code. In a case (hereinafter referred to as a departure scene) where the vehicle state determination unit 355 determines that (i) the vehicle is in the parked state and (ii) a signal indicating an operation of push SW 36 is inputted, the communication data generation unit 356 generates the request signal data to include both of the Wakeup ID and the random number code.

The request unit 357 requests the transmission of the request signal, and subsequently requests the transmission of the burst signal. In the present embodiment, the request unit 357 requests the transmission of the measurement purpose burst signal as the transmission of the burst signal. Further, in response to the instruction from the noise suppression control unit 358, the request unit 357 requests transmission of another burst signal for determining, in the portable device 2, radiation noise from the BCM 30. Hereinafter, the burst signal used for determining the radiation noise is referred to as noise determination purpose burst signal. The measurement purpose burst signal has different usage purpose from the noise determination purpose burst signal, and the signal names are designated for description convenience.

As an example, in the welcome scene, the request unit 357 requests a periodic and repeated transmission of the request signal, the measurement purpose burst signal and the noise determination purpose burst signal following the request signal. The request signal is generated by the communication data generation unit 356 to include the Wakeup ID but not include the random number code. In this case, for example, the transmission of request signal, measurement purpose burst signal, and the noise determination purpose burst signal may be performed in a predetermined order, such as the D seat antenna 31D, the P seat antenna 31P, and the rear bumper antenna 31R in described order. The noise suppression control unit 358 controls the request unit 357 to request all of the remaining LF antennas 31 (hereinafter referred to as remaining antenna group), except the LF antenna 31 that transmits the request signal (hereinafter referred to as genuine transmission antenna), to transmit the noise determination purpose burst signal at different transmission time points from one another and also from the transmission time of the noise determination purpose burst signal from the genuine transmission antenna.

In the unlocking scene, the request unit 357 requests transmission of the request signal, which includes the Wakeup ID and the random number code and is generated by the communication data generation unit 356, the measurement purpose burst signal and the noise determination purpose burst signal following the request signal, for example, in a single shot. In this case, the request unit 357 may request the transmission of the request signal, the measurement purpose burst signal, and the noise determination purpose burst signal from one of the outside antennas corresponding to the outside SW that is operated. The noise suppression control unit 358 instructs the request unit 357 to request transmission of the noise determination purpose burst signal from the remaining antenna group at different transmission time points from one another. The transmission time points of the noise determination purpose burst signal from the remaining antenna group are shifted from a transmission time of the noise determination purpose burst signal from the genuine transmission antenna.

In the locking scene, the request unit 357 requests transmission of the request signal, which includes the Wakeup ID and the random number code and is generated by the communication data generation unit 356, the measurement purpose burst signal and the noise determination purpose burst signal following the request signal. In this case, the request unit 357 may request the transmission of the request signal, the measurement purpose burst signal, and the noise determination purpose burst signal from one of the outside antennas corresponding to the outside SW that is operated. After transmitting the request signal, the measurement purpose burst signal may be transmitted from the inside antennas in a predetermined order at a different transmission time from one another. The noise suppression control unit 358 instructs the request unit 357 to request transmission of the noise determination purpose burst signal from the remaining antenna group at different transmission time points from one another. The transmission time points of the noise determination purpose burst signal from the remaining antenna group are shifted from a transmission time of the noise determination purpose burst signal from the genuine transmission antenna.

In the departure scene, the request unit 357 requests transmission of the request signal, which includes the Wakeup ID and the random number code and is generated by the communication data generation unit 356, the measurement purpose burst signal and the noise determination purpose burst signal following the request signal, for example, in a single shot. In this case, the request unit 357 may request the transmission of the request signal, the measurement purpose burst signal, and the noise determination purpose burst signal from the instrument panel antenna 31I that corresponds to the push SW 36. The noise suppression control unit 358 instructs the request unit 357 to request transmission of the noise determination purpose burst signal from the remaining antenna group, which excepts the instrument panel antenna 31I functioning as the genuine transmission antenna, at different transmission time points from one another. The transmission time points of the noise determination purpose burst signal from the remaining antenna group are shifted from a transmission time of the noise determination purpose burst signal from the instrument panel antenna 31I.

The registration unit 359 may be provided by an electrically rewritable non-volatile memory, and stores information related to the authentication. The information related to authentication may include a private key used in the public key cryptography method.

The verification unit 360 performs a process according to the response signal acquired from the RF receiver 32 via the LIN IF 351. For example, in the welcome scene, the verification unit 360 activates convenient functions, such as turning on of the welcome light, in response to the RF receiver 32 receiving the response signal, which does not include the encrypted code and the threshold value determination information included in the response signal is within a proper range. The RF receiver 32 receives the response signal in response to the request signal transmitted from the outside antenna. As an example, a drive signal for turning on the welcome light is output to each light, such as the position lamp, vehicle compartment inside lamp via the LIN IF 351 and the LIN driver 320 for automatically turning on these lamps.

In the locking and unlocking scenes, the verification unit 360 compares the encrypted code included in the response signal acquired from the RF receiver 32 via the LIN IF 351 with information related to authentication stored in the registration unit 359 in order to verify the response signal. Specifically, the verification unit 360 compares the encrypted code included in the response signal, which is acquired by the RF receiver 32 in response to the request signal transmitted from the outside antenna, with an encrypted code obtained by encrypting the random code of the challenge signal transmitted from the LF antenna 31 using the private key stored in the registration unit 359. In response to a success of the code verification and the threshold value determination information included in the response signal being within the proper range, the verification unit 360 outputs a drive signal for controlling the locking/unlocking of the door of the vehicle to the door lock motor via the LIN IF 351 and the LIN driver 320, and the vehicle locks or unlocks the door according to the drive signal.

In the departure scene, the verification unit 360 compares the encrypted code included in the response signal acquired from the RF receiver 32 via the LIN IF 351 with information related to authentication stored in the registration unit 359 in order to verify the response signal. Specifically, the verification unit 360 compares the encrypted code included in the response signal, which is acquired by the RF receiver 32 in response to the request signal transmitted from the inside antenna such as instrument panel antenna 31I, with an encrypted code obtained by encrypting the random code of the challenge signal transmitted from the LF antenna 31 using the private key stored in the registration unit 359. In response to a success of the code verification and the threshold value determination information included in the response signal being within the proper range, the verification unit 360 outputs a start permission signal to the power unit ECU via the CAN IF 352 and the CAN driver 330 to start the driving source of the vehicle.

The LF driver IC 300 controls the LF antenna 31 to transmit a signal. The LF driver IC 300 and the BCM 30 including the LF driver IC 300 correspond to a transmission control device. The LF driver IC 300 transmits the request signal from the LF antenna 31 according to a transmission request from the microcomputer 350. As shown in FIG. 2, the LF driver IC 300 includes, as functional blocks, a DCDC converter 301, an IC communication IF 302, LF drivers 303, and an LF control unit 304.

The DCDC converter 301 converts a DC voltage input from the DCDC circuit 310 into a power supply voltage required for the operation of the LF driver IC 300. The IC communication IF 302 performs a serial communication between the LF driver IC 300 and the microcomputer 350. The LF driver 303 outputs, to the LF antenna 31, a drive current for transmitting a signal according to a control of the LF control unit 304.

The LF control unit 304 controls the LF driver 303 to output, to the LF antenna 31, the drive current for transmitting a signal. The LF antenna 31 transmits a signal according to the drive current. The LF control unit 304 controls multiple LF drivers 303 independently from one another. When the LF control unit 304 receives the signal transmission request from the microcomputer 350 via the IC communication IF 302, the LF control unit 304 outputs, to the LF antenna 31, the drive current so that LF antenna 31 transmits the signal. The LF control unit 304 includes a first transmission control unit 341 and a second transmission control unit 342 as functional blocks. The first transmission control unit 341 and the second transmission control unit 342 may be provided by separate control circuits, or may be provided by a single control circuit.

The first transmission control unit 341 controls, in accordance with a request from the microcomputer 350, the LF antenna 31 to transmit the request signal, the measurement purpose burst signal, and the noise determination purpose burst signal. The second transmission control unit 342 controls, according to an instruction from the microcomputer 350, controls all of the remaining LF antennas 31, except the LF antenna 31 that transmits the request signal, to transmit the noise determination purpose burst signal at different transmission time points from one another. The transmission times of the noise determination purpose burst signals from all of the remaining LF antennas 31 controlled by the second transmission control unit 342 are shifted from the transmission time of the noise determination purpose burst signal from the LF antenna controlled by the first transmission control unit 341.

For example, in the welcome scene, the first transmission control unit 341 performs a polling of the D seat antenna 31D, the P seat antenna 31P, and the rear bumper antenna 31R to periodically and repeatedly transmit the request signal including the Wakeup ID but not the random number code, the measurement purpose burst signal and the noise determination purpose burst signal following the request signal. The second transmission control unit 342 shifts the transmission time of the noise determination purpose burst signal from the transmission time of the noise determination purpose burst signal controlled by the first transmission control unit 341. The second transmission control unit 342 controls all of the remaining LF antennas 31, except the LF antenna 31 that transmits the request signal, to transmit the noise determination purpose burst signal at different transmission time points from one another. A transmission period of the measurement purpose burst signal is separated from a transmission period of the noise determination purpose burst signal. The same applies to the subsequent description.

In the unlocking scene, the first transmission control unit 341 controls the outside antenna corresponding to the outside SW that is operated to transmit the request signal, which includes the Wakeup ID and the random number code, the measurement purpose burst signal and the noise determination purpose burst signal following the request signal. The second transmission control unit 342 shifts the transmission time of the noise determination purpose burst signal from the transmission time of the noise determination purpose burst signal controlled by the first transmission control unit 341. The second transmission control unit 342 controls all of the remaining LF antennas 31, except the LF antenna 31 that transmits the request signal, to transmit the noise determination purpose burst signal at different transmission time points from one another.

In the locking scene, the first transmission control unit 341 controls the outside antenna corresponding to the outside SW that is operated to transmit the request signal, which includes the Wakeup ID and the random number code, the measurement purpose burst signal and the noise determination purpose burst signal following the request signal. After transmitting the request signal, the first transmission control unit 341 shifts a transmission time of the measurement purpose burst signal from the transmission time of request signal, and controls the inside antennas of the vehicle to transmit the measurement purpose burst signal in a predetermined order. The second transmission control unit 342 shifts the transmission time of the noise determination purpose burst signal from the transmission time of the noise determination purpose burst signal controlled by the first transmission control unit 341. The second transmission control unit 342 controls all of the remaining LF antennas 31, except the LF antenna 31 that transmits the request signal, to transmit the noise determination purpose burst signal at different transmission time points from one another.

Figure 4:
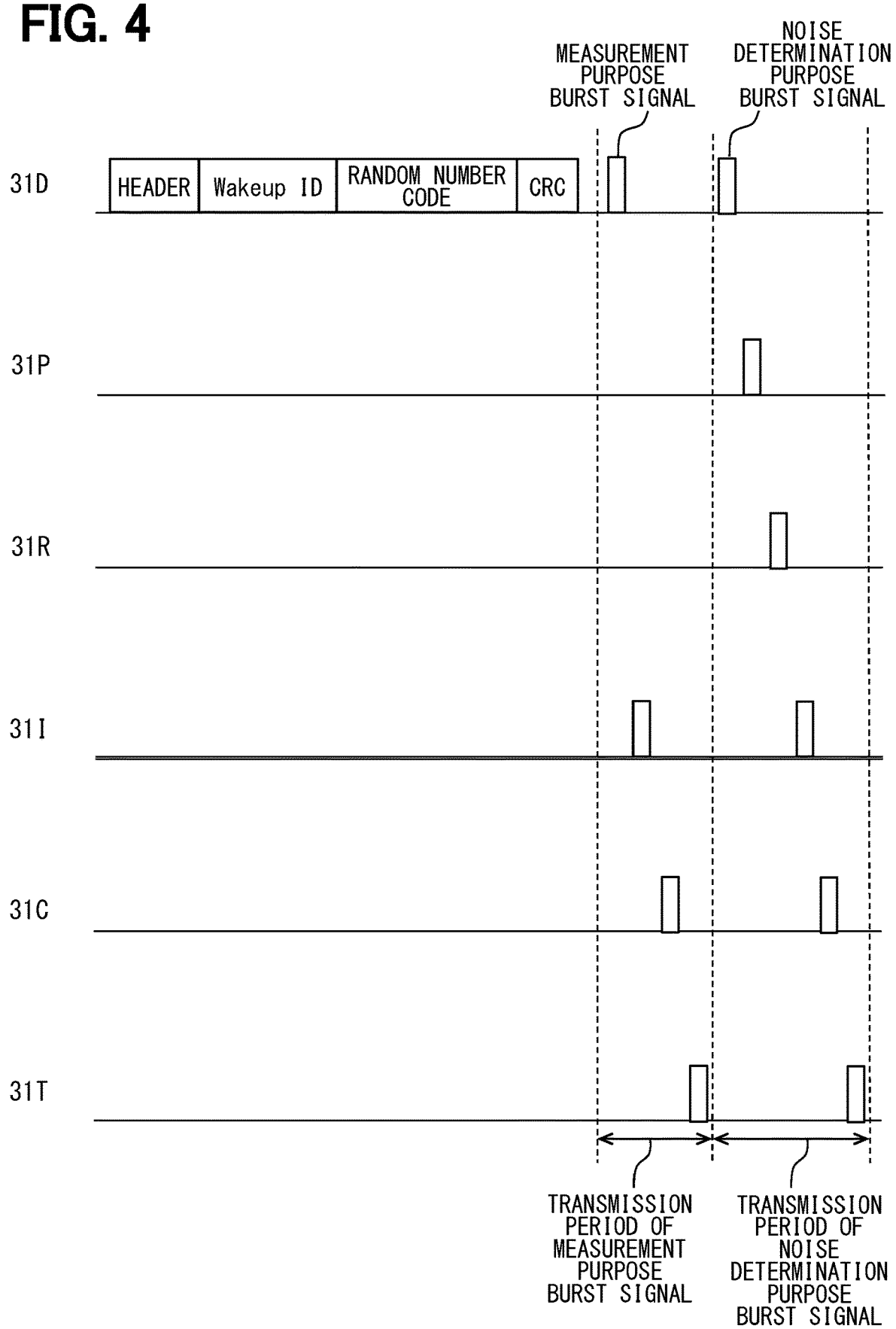
FIG. 4 is a diagram showing an example of signal transmission in a case of vehicle locked situation according to a first embodiment.

The following will describe an example of signal transmission in the locking scene with reference to FIG. 4. In the example shown in FIG. 4, suppose that the D seat door handle SW 33 is operated by the user, and the D seat antenna 31D transmits the request signal.

When the D seat door handle SW 33 is operated, as shown in FIG. 4, the D seat antenna 31D transmits the request signal including the Wakeup ID and the random number code, and then transmits the measurement purpose burst signal and the noise determination purpose burst signal following the request signal. After transmission of the request signal and the measurement purpose burst signal from the D seat antenna 31D, the measurement purpose burst signal is transmitted from other inside antennas, such as the instrument panel antenna 31I, the center console antenna 31C, and the trunk antenna 31T in a predetermined order by shifting the transmission time of the measurement purpose burst signal from one another. In the example shown in FIG. 4, the measurement purpose burst signal is transmitted in the order of the instrument panel antenna 31I, the center console antenna 31C, and the trunk antenna 31T at different transmission times from one another. The transmission time of the measurement purpose burst signal is shifted among multiple LF antennas 31 in order to distinguish the measurement purpose burst signal is transmitted from which LF antenna 31.

As shown in FIG. 4, all of the LF antennas 31 except the D seat antenna 31D, that is, the P seat antenna 31P, the rear bumper antenna 31R, the instrument panel antenna 31I, the center console antenna 31C, the trunk antenna 31T, transmit the noise determination purpose burst signal at different transmission time points from one another. The transmission time points of the noise determination purpose burst signal from the LF antennas 31 except the D seat antenna 31D are shifted from the transmission time point of the noise determination purpose burst signal from the D seat antenna 31D. The transmission time points of the noise determination purpose burst signal are also shifted among the multiple LF antennas 31 in order to distinguish the noise determination purpose burst signal is transmitted from which LF antenna 31.

In the departure scene, the first transmission control unit 341 controls the instrument panel antenna 31I corresponding to the push SW 36 that is operated to transmit the request signal, which includes the Wakeup ID and the random number code, the measurement purpose burst signal and the noise determination purpose burst signal following the request signal. The second transmission control unit 342 shifts the transmission time of the noise determination purpose burst signal from the transmission time of the noise determination purpose burst signal controlled by the first transmission control unit 341. The second transmission control unit 342 controls all of the remaining LF antennas 31, except the instrument panel antenna 31I, to transmit the noise determination purpose burst signal at different transmission time points from one another.

When the BCM 30 drives the LF antenna 31 to transmit the signals, the signals are transmitted from the LF antenna 31. At the same time, radiation noise of the signals are also transmitted from the wiring and wire harness of the printed circuit of BCM 30 and extends toward the immediate vicinity of the BCM 30.

All of the transmission ranges of the D seat antenna 31D, the P seat antenna 31P, the rear bumper antenna 31R, the instrument panel antenna 31I, the center console antenna 31C, and the trunk antenna 31T do not have a common area. With this configuration, when the portable device 2 exists in the transmission range of the LF antenna 31 that transmits the request signal, the noise determination purpose burst signal cannot received by all of the LF antennas 31. When the portable device 2 exists in the immediate vicinity of the BCM 30, the radiation noise radiated for driving all of the LF antennas 31 may be received. Thus, the portable device 2 may receive, as the radiation noise, the noise determination purpose burst signals corresponding to all of the LF antennas 31.

(Schematic Configuration of Portable Device 2)

Figure 5:
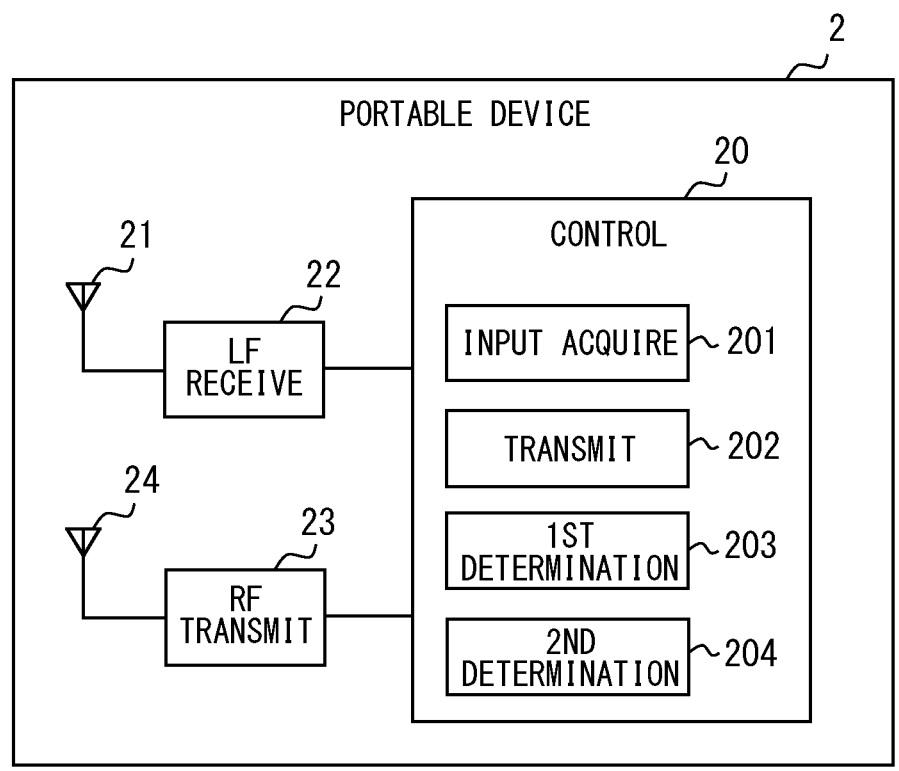
FIG. 5 is a diagram showing an example of a schematic configuration of a portable device.

The following will describe a configuration of the portable device 2 with reference to FIG. 5. As shown in FIG. 2, the portable device 2 includes a control device 20, a LF reception antenna 21, a LF reception unit 22, a RF transmission unit 23, and a RF transmission antenna 24. The portable device 2 has an electronic key function. The portable device 2 may be provided by a key fob, a multifunctional mobile phone having the electronic key function, or the like.

The LF reception antenna 21 receives a signal transmitted from the vehicle unit 3 by radio waves having the LF band. The signals received by the LF reception antenna 21 may include the request signal, the measurement purpose burst signal, and the noise determination purpose burst signal.

The LF reception unit 22 generates a reception signal by electrically processing the request signal received by the LF reception antenna 21, and outputs the generated reception signal to the control device 20. The LF reception unit 22 corresponds to a portable device reception unit. The LF reception unit 22, which may include an IC or the like, determines a validity of the Wakeup ID in a case where the request signal includes the Wakeup ID. As an example, the LF reception unit 22 compares a pattern of the genuine code registered in advance in a non-volatile memory of the LF reception unit 22 with the received Wakeup ID, and determines whether the received Wakeup ID is the genuine code. In response to determining that the WAKE code is a genuine signal pattern, the control device 20 switches from the sleep state to the wakeup state. In the sleep state, a power consumption is significantly reduced compared with the wakeup state. In response to the LF reception unit 22 determining that the WAKE code does not match the genuine signal pattern and the WAKE code is different from the genuine signal pattern, the control device 20 does not switch from the sleep state to the wakeup state.

The LF reception unit 22 measures RSSI of the burst signal received by the LF reception antenna 21 followed by the request signal, and outputs the measured RSSI to the control device 20. The LF reception unit 22 measures the RSSI of the burst signal by, for example, an RSSI measuring circuit or the like. The LF reception unit 22 measures the RSSI of the measurement purpose burst signal, and also measures the RSSI of the noise determination purpose burst signal.

The control device 20 may be provided by an IC, a microcomputer, or the like. As shown in FIG. 5, the control device 20 includes an input acquiring unit 201, a transmission control unit 202, a first determination unit 203, and a second determination unit 204 as functional blocks. The control device 20 executes various processes which will be described below.

The input acquiring unit 201 acquires an input from the LF reception unit 22. The transmission control unit 202 generates an original signal of the response signal in response to the reception signal acquired by the input acquiring unit 201. The LF reception unit 22 generates the reception signal in response to a reception of the request signal, and the input acquiring unit 201 acquires the reception signal from the LF reception unit 22. The transmission control unit 202 outputs the original signal to the RF transmission unit 23. In a case where the request signal includes the random number code, the random number code is encrypted by a private key and an encryption algorithm under a public key cryptography method. In this way, the control device 20 generates an encrypted code. Then, the control device 20 includes the encrypted code in the original signal of the response signal, and outputs the original signal of the response signal to the RF transmission unit 23. In a case where the request signal does not include the random number code, the transmission control unit 202 may output the original signal of the response signal, which indicates that the Wakeup ID has been received, to the RF transmission unit 23. In this case, the original signal of the response signal does not include the encrypted code.

The first determination unit 203 determines whether the measured RSSI of the measurement purpose burst signal is within the threshold range which is set for the measurement purpose burst signal in advance. The measured RSSI of the measurement purpose burst signal is acquired by the input acquiring unit 201. Then, the information (hereinafter referred to as threshold value determination information) indicating whether the RSSI is within the threshold range is included in the response signal which is generated by the transmission control unit 202. The threshold range may be preliminarily set as described above.

The second determination unit 204 determines whether the measured RSSIs of the noise determination purpose burst signals are equal to or greater than a threshold value (hereinafter referred to as a noise threshold value) which is set for the noise determination purpose burst signal in advance. The RSSIs of the noise determination purpose burst signals are measured by the LF reception unit 22, and the measured RSSI of the noise determination purpose burst signals acquired by the input acquiring unit 201. The noise threshold value may be set so that whether the noise determination purpose burst signal included in the radiation noise is received or not. The second determination unit 204 performs the threshold value determination. In response to the measured RSSI being equal to or greater than the predetermined threshold value, the second determination unit 204 determines that the noise determination purpose burst signal is received. The second determination unit 204 corresponds to a portable device determination unit.

In a case where the second determination unit 204 determining the reception of the noise determination purpose burst signals and the number of the received noise determination purpose burst signals is less than a total number of all of the LF antennas 31, the transmission control unit 202 transmits the response signal from the RF transmission unit 23. In a case where the second determination unit 204 determining the reception of the noise determination purpose burst signals and the number of the received noise determination purpose burst signals is equal to the total number of all of the LF antennas 31, the transmission control unit 202 does not transmit the response signal from the RF transmission unit 23. Whether the received signals by the LF antennas 31 are the radiation noises transmitted from the BCM 30 is determined based on the total number of the received noise determination purpose burst signals. When determining that the received noise determination purpose burst signals are the radiation noise, the response signal is not transmitted. The transmission control unit 202 corresponds to a portable device transmission control unit.

Execution of the above-described process corresponds to execution of a control method of the portable device 2. The control device 20 may be provided by a microcomputer or the like, and may be configured to perform the above-described process by executing a control program stored, as a program product, in a memory. Whether the signal received by the LF reception antenna 21 is the measurement purpose burst signal or the noise determination purpose burst signal may be distinguished based on the transmission time of the signal which is preliminarily set with respect to the transmission time of the request signal.

The RF transmission unit 23 generates the response signal by electrically processing the original signal output from the control device 20. The RF transmission unit 23 transmits the generated response signal via the RF transmission antenna 24. The RF transmission antenna 24 transmits the response signal using radio waves having UHF band.

(Transmission Control Related Process in BCM 30)

Figure 6:
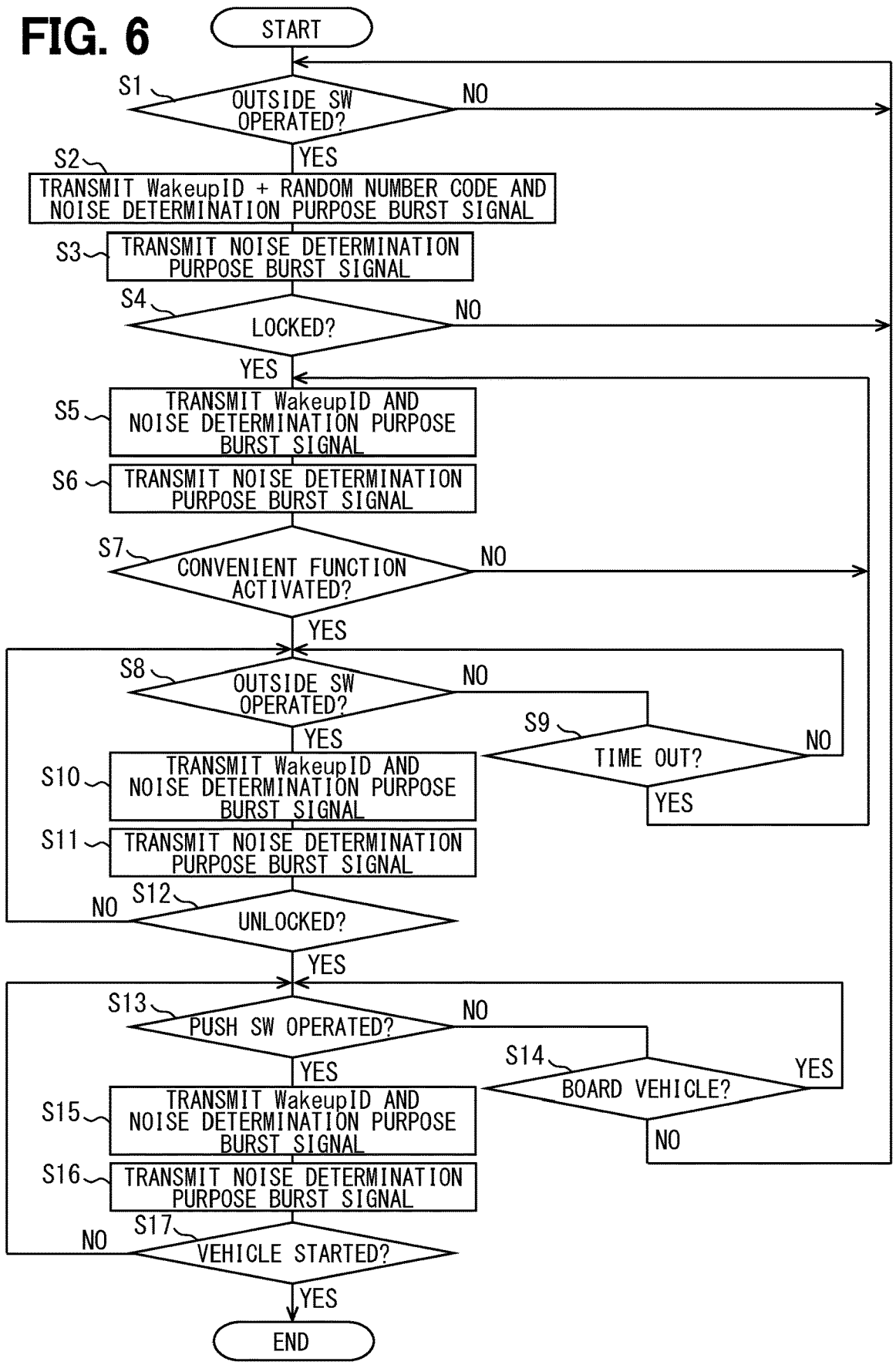
FIG. 6 is a flowchart showing an example of a transmission control process executed by a BCM.

The following will describe an example of the transmission control related process executed by the BCM 30 with reference to FIG. 6. The flowchart of FIG. 6 may be configured to start when the vehicle is parked and then the vehicle door is opened and closed. The parked state of the vehicle may be determined by the vehicle state determination unit 355, and opening and closing of the vehicle door may be determined based on the signal from the door courtesy switch.

In S1, when the outside SW of the vehicle is operated (S1: YES), the process proceeds to S2. Whether the outside SW is operated or not may be determined based on the signal acquired by the communication data generation unit 356 via the SW input circuit 340. When the outside SW is not operated (S1: NO), the process repeats S1.

In S2, the communication data generation unit 356 generates the request signal data which includes the Wakeup ID and the random number code. The request unit 357 requests a transmission of the request signal, which includes the Wakeup ID and the random number code, the measurement purpose burst signal and the noise determination purpose burst signal following the request signal from the outside antenna which corresponds to the outside SW that is determined to be operated in S1. With this configuration, the outside antenna corresponding to the outside switch determined to be operated in S1 is able to transmit the request signal that includes the Wakeup Id and the random number code, the measurement purpose burst signal and the noise determination purpose burst signal following the request signal.

In S3, the request unit 357 controls all of the remaining LF antennas 31, except the LF antenna 31 that transmits the request signal (that is, the genuine transmission antenna) in S2, to transmit the noise determination purpose burst signal at different transmission time points from one another and also from the transmission time of the noise determination purpose burst signal from the genuine transmission antenna. Thus, all of the LF antennas 31 except the genuine transmission antenna are able to transmit the noise determination purpose burst signals at different transmission time points from one another, and the transmission time points are also shifted from the transmission time point of the noise determination purpose burst signal from the genuine transmission antenna.

When the portable device 2 exists in the immediate vicinity of the BCM 30 and the radiation noises from all of the LF antennas 31 are received by the portable device 2, the noise determination purpose burst signals from all of the LF antennas 31 are received as the radiation noise. Therefore, the response signal is not transmitted from the portable device 2. When the portable device 2 exists within the transmission range of the genuine transmission antenna, the portable device 2 cannot receive the noise determination purpose burst signals from all of the LF antennas 31. Thus, the portable device 2 transmits the response signal. The verification unit 360 authenticates the encrypted code included in the response signal transmitted from the portable device 2, and locks the vehicle door in response to the success of the authentication.

In S4, when the verification unit 360 determines that the authentication is succeeded, the vehicle door is locked (S4: YES), and the process proceeds to S5. When the verification unit 360 determines the authentication is failed, the vehicle door is not locked (S4: NO), and the process returns to S1 and the process is repeated.

In S5, the communication data generation unit 356 generates the request signal data which includes the Wakeup ID but not include the random number code. The request unit 357 periodically requests the transmission of request signal, which includes the Wakeup ID, the measurement purpose burst signal and the noise determination purpose burst signal following the request signal from the outside antennas in a predetermined order, such as the D seat antenna 31D, the P seat antenna 31P, and the rear bumper antenna 31R in described order. With this configuration, polling is performed so that the request signals including the Wakeup ID but not including the random number code is periodically and sequentially transmitted from the D seat antenna 31D, the P seat antenna 31P, and the rear bumper antenna 31R.

In S6, the request unit 357 controls all of the remaining LF antennas 31, except the outside antenna that transmits the request signal (that is, the genuine transmission antenna) in S5, to transmit the noise determination purpose burst signal at different transmission time points from one another and also from the transmission time of the noise determination purpose burst signal from the genuine transmission antenna. Thus, all of the LF antennas 31 except the genuine transmission antenna are able to periodically transmit the noise determination purpose burst signals at different transmission time points from one another, and the transmission time points are also shifted from the transmission time point of the noise determination purpose burst signal from the genuine transmission antenna.

When the portable device 2 exists within the transmission range of the genuine transmission antenna, the portable device 2 cannot receive the noise determination purpose burst signals from all of the LF antennas 31. Thus, the portable device 2 transmits the response signal. When the request signal does not include the random number code, the response signal in response to the request signal does not include the encrypted code. In response to the RF receiver 32 receiving the response signal that does not include the encrypted code, the verification unit 360 activates the convenient function such as turning on the welcome light or the like.

In S7, when the RF receiver 32 receives the response signal that does not include the encrypted code and the verification unit 360 activates the convenient function (S7: YES), the process proceeds to S8. When the RF receiver 32 does not receive the response signal that does not include the encrypted code and the verification unit 360 does not activate the convenient function (S7: NO), the process returns to S5. The periodic transmission of the request signal is repeated.

In S8, when the outside SW of the vehicle is operated (S8: YES), the process proceeds to S10. When the outside SW is not operated (S8: NO), the process proceeds to S9. In S9, when the elapsed time from the activation of the convenient function in S7 exceeds a predetermined duration, that is, time outs (S9: YES), the process returns to S5 and the periodic transmission of the request signal is repeated. When the elapsed time from the activation of the convenience function in S7 does not exceed the predetermined duration, that is, time does not out (S9: NO), the process returns to S8 and repeats S8 and S9. The predetermined duration for determining timeout may be properly set as necessary.

In S10, the communication data generation unit 356 generates the request signal data which includes the Wakeup ID and the random number code. The request unit 357 requests a transmission of the request signal, which includes the Wakeup ID and the random number code, the measurement purpose burst signal and the noise determination purpose burst signal following the request signal from the outside antenna which corresponds to the outside SW that is determined to be operated in S8. With this configuration, the outside antenna corresponding to the outside switch determined to be operated in S8 is able to transmit the request signal that includes the Wakeup Id and the random number code, the measurement purpose burst signal and the noise determination purpose burst signal following the request signal.

In S11, the request unit 357 controls all of the remaining LF antennas 31, except the LF antenna 31 that transmits the request signal (that is, the genuine transmission antenna) in S10, to transmit the noise determination purpose burst signal at different transmission time points from one another and also from the transmission time of the noise determination purpose burst signal from the genuine transmission antenna. Thus, all of the LF antennas 31 except the genuine transmission antenna are able to transmit the noise determination purpose burst signals at different transmission time points from one another, and the transmission time points are also shifted from the transmission time point of the noise determination purpose burst signal from the genuine transmission antenna.

When the portable device 2 exists within the transmission range of the genuine transmission antenna, the portable device 2 cannot receive the noise determination purpose burst signals from all of the LF antennas 31. Thus, the portable device 2 transmits the response signal. The verification unit 360 authenticates the encrypted code included in the response signal transmitted from the portable device 2, and unlocks the vehicle door in response to the success of the authentication.

In S12, when the verification unit 360 determines that the authentication is succeeded, the vehicle door is unlocked (S12: YES), and the process proceeds to S13. When the verification unit 360 determines the authentication is failed, the vehicle door is not unlocked (S12: NO), and the process returns to S8 and the process is repeated.

In S13, when the push SW 36 is operated (S13: YES), the process proceeds to S15. When the push SW 36 is not operated (S13: NO), the process proceeds to S14. In S14, when the user boards the vehicle (S14: YES), the process returns to 13 and repeats S13 and S14. When the user does not board the vehicle (S14: NO), the process returns to S1 and the process is repeated. Whether the user boards the vehicle or not be determined by determining whether the vehicle door is opened or closed based on the signal of the door courtesy switch acquired by the communication data generation unit 356 via the SW input circuit 340. In addition, the determination may also be made based on a signal of a seat sensor of the vehicle or the like.

In S15, the communication data generation unit 356 generates the request signal data which includes the Wakeup ID and the random number code. The request unit 357 requests a transmission of the request signal, which includes the Wakeup ID and the random number code, the measurement purpose burst signal and the noise determination purpose burst signal following the request signal from the instrument panel antenna 31I. With this configuration, the instrument panel antenna 31I is able to transmit the request signal that includes the Wakeup ID and the random number code, the measurement purpose burst signal and the noise determination purpose burst signal following the request signal.

In S16, the request unit 357 controls all of the LF antenna 31 except the instrument panel antenna 31I to transmit the noise determination purpose burst signal at different transmission time points from one another. Also, the transmission time points of the noise determination purpose burst signal are shifted from the transmission time point of the noise determination purpose burst signal from the instrument panel antenna 31I. Thus, all of the LF antennas 31 except the instrument panel antenna 31I are able to transmit the noise determination purpose burst signals at different transmission time points from one another, and the transmission time points are also shifted from the transmission time point of the noise determination purpose burst signal from the instrument panel antenna 31I.

When the portable device 2 exists within the transmission range of the instrument panel antenna 31I, the portable device 2 cannot receive the noise determination purpose burst signals from all of the LF antennas 31. Thus, the portable device 2 transmits the response signal. The verification unit 360 authenticates the encrypted code included in the response signal transmitted from the portable device 2, and permits a start of driving source of the vehicle door in response to the success of the authentication.

In S17, when the verification unit 360 succeeds in the authentication and the driving source of the vehicle is started (S17: YES), the transmission control related process is ended. When the verification unit 360 fails in the authentication and the driving source of the vehicle is not started (S17: NO), the process returns to S13 and the process is repeated.

(Response Transmission Related Process in Portable Device)

Figure 7:
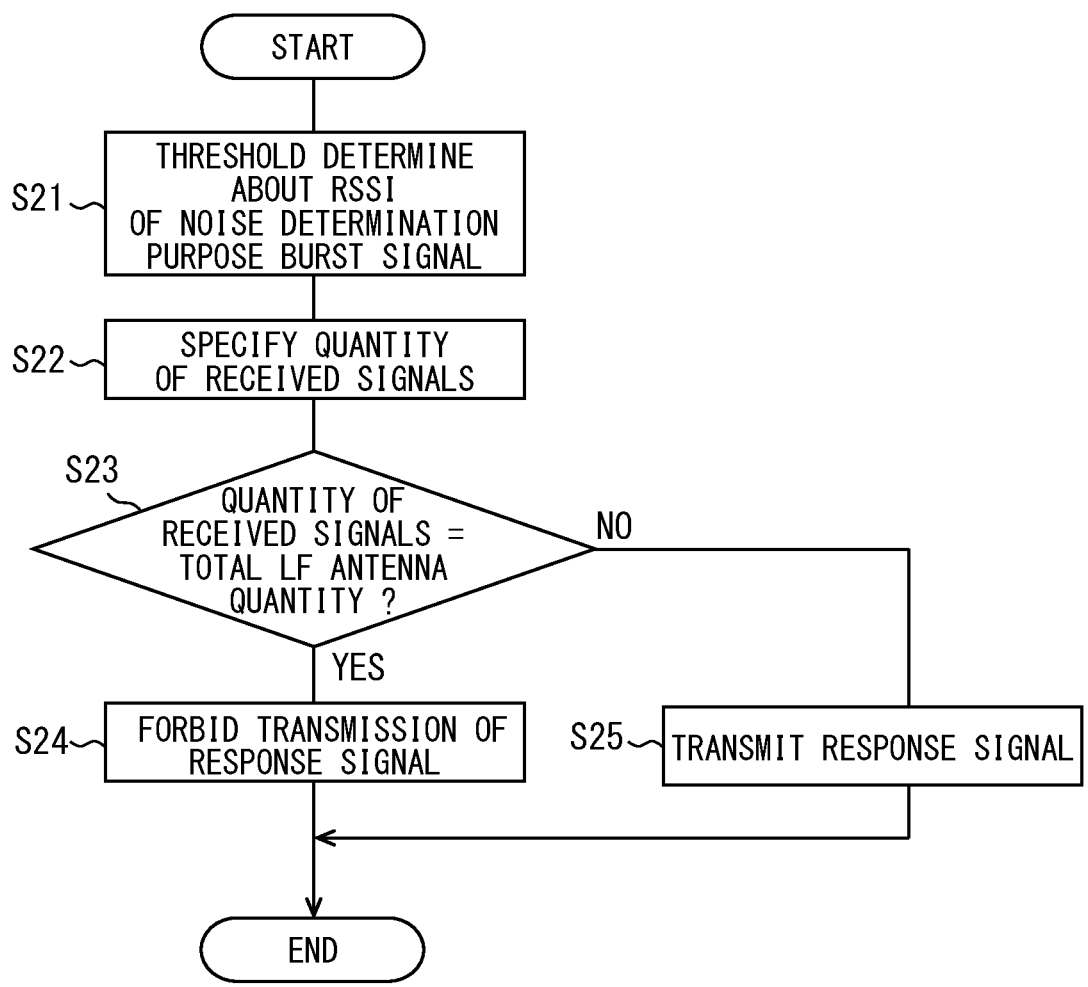
FIG. 7 is a flowchart showing an example of response transmission process executed by a portable device.

The following will describe an example of a process (hereinafter referred to as response transmission related process) related to a transmission of the response signal by the portable device 2 with reference to the flowchart shown in FIG. 7. The flowchart of FIG. 7 may be configured to start when the portable device switches to the wakeup state in response to receiving of the Wakeup ID included in the request signal by the LF reception antenna 21.

In S21, the second determination unit 204 determines whether the RSSIs of the noise determination purpose burst signals measured in the LF reception unit 22 are equal to or greater than the noise threshold value. Suppose that the second determination unit 204 determines that the RSSIs of the received noise determination purpose burst signals measured in the LF reception unit 22 are equal to or greater than the noise threshold value. In S22, the second determination unit 204 specifies a quantity (hereinafter referred to as reception quantity) of the noise determination purpose burst signals received in S21.

In S23, the second determination unit 204 determines whether the reception quantity specified in S22 is equal to a total quantity (hereinafter referred to as a total LF antenna quantity) of the LF antennas 31 that transmit the noise determination purpose burst signals. When the reception quantity specified in S22 is equal to the total LF antenna quantity (S23: YES), the second determination unit 204 determines that the noise determination purpose burst signals from all of the LF antennas are received, and the process proceeds to S24. When the reception quantity specified in S22 is less than the total LF antenna quantity (S23: NO), the second determination unit 204 determines that the noise determination purpose burst signals from partial LF antennas are received, and the process proceeds to S25.

In S24, the transmission control unit 202 does not transmit the response signal from the RF transmission unit 23, and ends the response transmission related process. In S25, the transmission control unit 202 transmits the response signal from the RF transmission unit 23, and ends the response transmission related process.

According to the configuration of the first embodiment, the genuine code and the noise determination purpose burst signal following the genuine code are transmitted toward the transmission range of the genuine transmission antenna. The noise determination purpose burst signal is also transmitted toward the transmission range of each LF antennal 31 included in the remaining antenna group at a different transmission time point from one another. The remaining antenna group is a group of the LF antennas except the genuine transmission antenna. The transmission time point of the noise determination purpose burst signal from each LF antenna 31 included in the remaining antenna group is shifted from the transmission time point of the noise determination purpose burst signal from the genuine transmission antenna. All of the transmission ranges of all of the LF antennas 31 do not have a common area. Thus, when the portable device 2 receives the genuine code within the transmission range of the genuine transmission antenna, the portable device 2 cannot receive, together with the noise determination purpose burst signal from the genuine transmission antenna, the noise determination purpose burst signal from each of the remaining antenna group.

The BCM 30 drives the genuine transmission antenna, and also drives the remaining antenna group. When transmitting the noise determination purpose burst signals from the genuine transmission antenna and the remaining antenna group, the BCM 30 emits radiation noise of the noise determination purpose burst signals. When the portable device 2 exists within the immediate vicinity of the BCM 30 where the radiation noise is able to be received, the portable device 2 receives the radiation noise corresponding to the noise determination purpose burst signals from the genuine transmission antenna and the remaining antenna group.

When the portable device 2 receives the radiation noise radiated from the BCM 30 as described above, the pattern of the noise determination purpose burst signals is different from a case where the portable device 2 does not receive the radiation noise.

When the portable device 2 determines that not all of the noise determination purpose burst signals are received, the response signal is transmitted in response to the genuine code. Thus, when the portable device 2 receives the genuine code within the transmission range of the genuine transmission antenna, the portable device 2 can transmit the response signal to enable a position detection of the portable device 2. When the portable device 2 determines that all of the noise determination purpose burst signals are received, the response signal is not transmitted in response to the genuine code. Thus, when the portable device 2 receives the radiation noise, the portable device 2 can forbid transmission of the response signal to suppress an erroneous detection of the portable device 2.

Second Embodiment

In the first embodiment, the BCM 30 transmits the measurement purpose burst signal after the transmission of request signal. The present disclosure is not necessarily limited to this configuration. For example, the BCM 30 may be configured to transmit the request signal but not to transmit the measurement purpose burst signal following the request signal (hereinafter referred to as second embodiment).

Figure 8:
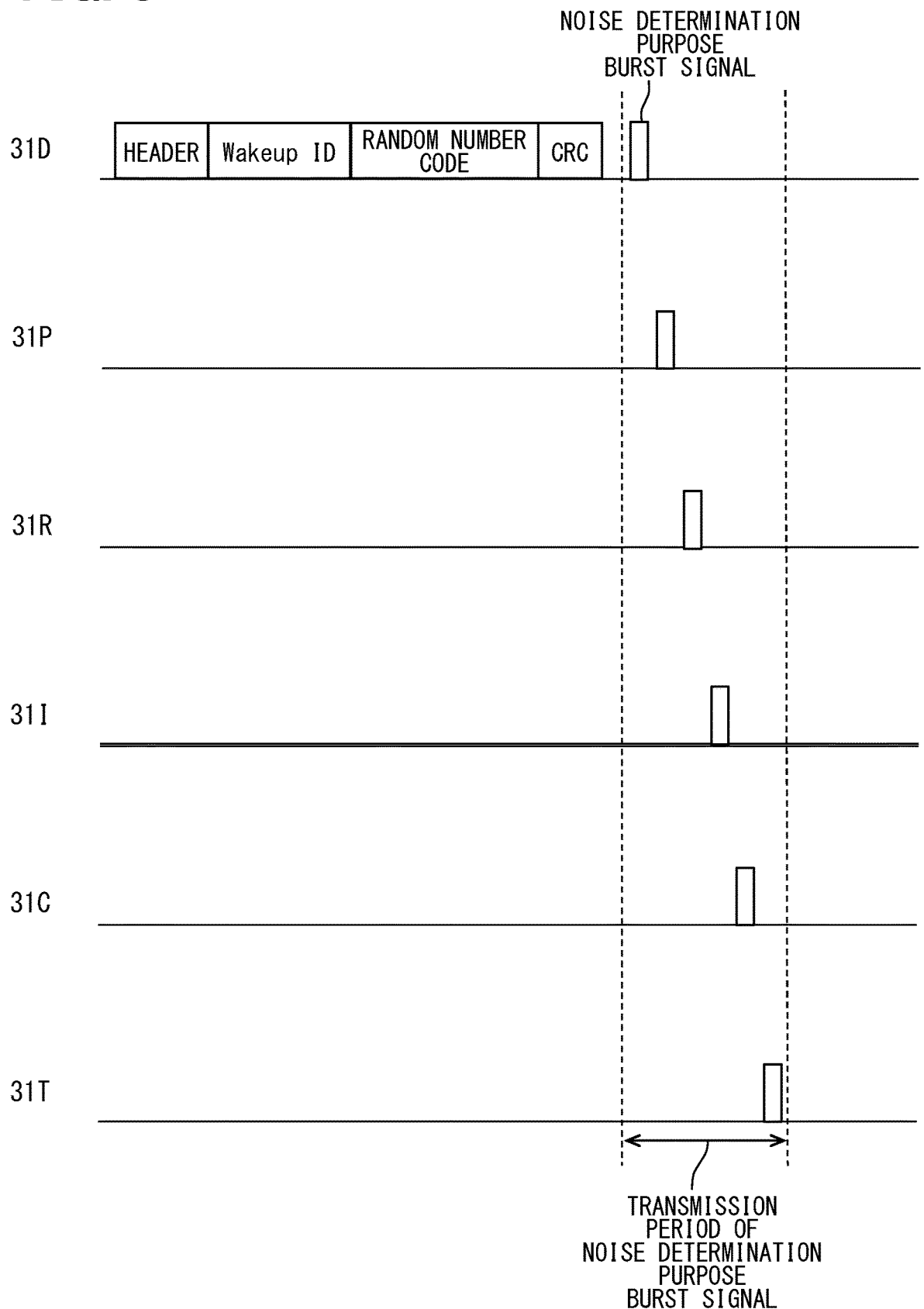
FIG. 8 is a diagram showing an example of signal transmission in a case of vehicle locked situation according to a second embodiment.

The following will describe an example of signal transmission in the locking scene according to the second embodiment with reference to FIG. 8. In the example shown in FIG. 8, suppose that the D seat door handle SW 33 is operated by the user, and the D seat antenna 31D transmits the request signal.

When the D seat door handle SW 33 is operated, as shown in FIG. 8, the D seat antenna 31D transmits the request signal including the Wakeup ID and the random number code, and then transmits the noise determination purpose burst signal following the request signal. As shown in FIG. 8, all of the LF antennas 31 except the D seat antenna 31D, that is, the P seat antenna 31P, the rear bumper antenna 31R, the instrument panel antenna 31I, the center console antenna 31C, the trunk antenna 31T, transmit the noise determination purpose burst signal at different transmission time points from one another. The transmission time points of the noise determination purpose burst signal from the LF antennas 31 except the D seat antenna 31D are shifted from the transmission time point of the noise determination purpose burst signal from the D seat antenna 31D.

In the second embodiment, the noise determination purpose burst signal may be used as the measurement purpose burst signal described in the first embodiment. According to this configuration, the individual transmission of the measurement purpose burst signal from the noise determination purpose burst signal can be forbidden. Thus, in the BCM 30, the dark current corresponding to the measurement purpose burst signal can be reduced and relay attack can also be reliably ensured. The measurement purpose burst signal described in the first embodiment may be used to reinforcement of the position detection of the portable device 2 by using a distance attenuation characteristic of RSSI, in addition to the relay attack countermeasure. In this case, the noise determination purpose burst signal may be used as the measurement purpose burst signal. With this configuration, it is possible to further improve a detection accuracy of the position of the portable device 2 while suppressing the dark current in the BCM 30.

Third Embodiment

In the foregoing embodiments, the request signal including the random number code is transmitted in response to the operation of the outside SW of the vehicle as a trigger during the parked and locked state of the vehicle. The present disclosure is not necessarily limited to this configuration. For example, when the vehicle is in parked and locked state, the request signal including the random number code may also be periodically transmitted before the operation of the outdoor SW.

Fourth Embodiment

In the above embodiment, the request signal is also periodically transmitted before the operation of the outside SW of the vehicle when the vehicle is in parked and locked state. The present disclosure is not necessarily limited to this configuration. For example, when the vehicle is in parked and locked state, the request signal may be configured not be transmitted until the outdoor SW is operated.

Fifth Embodiment

In the foregoing embodiments, the noise determination purpose burst signal is transmitted from all of the LF antennas 31 mounted on the vehicle. However, the transmission of noise determination purpose burst signal is not limited to all of the LF antennas 31. The noise determination purpose burst signal may be transmitted from partial LF antennas 31 mounted on the vehicle (hereinafter referred to as fifth embodiment) under a condition that the partial LF antennas 31 include the genuine transmission antenna and transmission ranges of the partial LF antennas 31 do not have a common area.

In the fifth embodiment, the second determination unit 204 is configured to determine whether a quantity of the received noise determination purpose burst signals is equal to a total quantity of the partial LF antennas 31 that transmit the noise discrimination burst signals. For the total quantity of the LF antennas 31 that transmit the noise determination purpose burst signal, the second determination unit 204 may determine whether corresponding quantity of the noise determination purpose burst signals are received.

In the fifth embodiment, even when the first transmission control unit 341 and the second transmission control unit 342 switch the LF antenna 31 that transmits the noise determination purpose burst signal, the total number of the LF antennas 31 that transmit the noise discrimination burst signal may maintain the same without change. With this configuration, although the LF antenna 31 that transmits the noise determination purpose burst signal switches from one to another, for the fixed total quantity of the LF antennas 31 that transmit the noise determination purpose burst signal, whether corresponding quantity of the noise determination purpose burst signals are received can be determined by the portable device 2. Thus, for all of the LF antennas 31 that transmit the noise determination purpose burst signal, whether corresponding quantity of the noise determination purpose burst signals are received can be determined in a more simple manner.

Sixth Embodiment

In the foregoing embodiments, the vehicle unit 3 includes, as the LF antennas 31, the D seat antenna 31D, the P seat antenna 31P, the rear bumper antenna 31R, the instrument panel antenna 31I, the center console antenna 31C, and the trunk antenna 31T. However, the present disclosure is not limited to this configuration. For example, the antenna arrangement may be different, or the number of antennas may be different.

Note that the present disclosure is not limited to the embodiments described above and can variously be modified within the scope of the disclosure. An embodiment obtained by appropriately combining the technical means disclosed in the different embodiments is also included in the technical scope of the present disclosure. The control device, control unit and the control method described in the present disclosure may be implemented by a special purpose computer which includes a processor programmed to execute one or more functions executed by computer programs. Alternatively, the control device and the control method described in the present disclosure may be implemented by a special purpose hardware logic circuit. Alternatively, the control device and the control method described in the present disclosure may be implemented by one or more special purpose computers configured by a combination of a processor executing a computer program and one or more hardware logic circuits. The computer programs may be stored, as instructions to be executed by a computer, in a tangible non-transitory computer-readable storage medium.

It is noted that a flowchart or the process of the flowchart in the present disclosure includes multiple steps (also referred to as sections), each of which is represented, for example, as S1. Further, each step can be divided into several sub-steps while several steps can be combined into a single step.

While various embodiments, configurations, and aspects of the transmission control device, portable device, vehicle system, transmission control method, control method, and control program products according to the present disclosure have been exemplified, the embodiments, configurations, and aspects of the present disclosure are not limited to those described above. For example, embodiments, configurations, and examples obtained from an appropriate combination of technical elements disclosed in different embodiments, configurations, and examples are also included within the scope of the embodiments, configurations, and examples of the present disclosure.

What is claimed is:

1. A transmission control device, which is mounted on a vehicle and drives a plurality of antennas to detect a position of a portable device relative to the vehicle using a wireless communication between the portable device and the plurality of antennas, the plurality of antennas being arranged at respective positions of the vehicle to have different transmission ranges from one another, and the portable device being carried by a user, the transmission control device comprising:
a first transmission control unit configured to control a genuine transmission antenna to transmit, with use of a carrier wave, a genuine code that activates the portable device and a noise determination purpose burst signal following the genuine code, and the genuine transmission antenna being one of the plurality of antennas and the portable device using the noise determination purpose burst signal to determine a noise; and
a second transmission control unit configured to control each antenna of a remaining antenna group, which includes remaining antennas of the plurality of antennas except the genuine transmission antenna, to transmit the noise determination purpose burst signal at a transmission time point, which is set different from one another and shifted from a transmission time point of the noise determination purpose burst signal from the genuine transmission antenna, and the transmission ranges of the plurality of antennas which include the genuine transmission antenna being set to not have a common area.

2. The transmission control device according to claim 1, wherein
the first transmission control unit controls the genuine transmission antenna to transmit a measurement purpose burst signal after transmitting the genuine code, and then the first transmission control unit controls the first antenna to transmit the noise determination purpose burst signal,
the measurement purpose burst signal has a different use purpose from the noise determination purpose burst signal and is used for measuring a received signal strength in the portable device, and
the second transmission control unit controls each antenna of the remaining antenna group to transmit the measurement purpose burst signal at a transmission time point, which is set different from one another and shifted from a transmission time point of the measurement purpose burst signal from the genuine transmission antenna, and then the second transmission control unit controls each antenna of the remaining antenna group to transmit the noise determination purpose burst signal at the transmission time point, which is set different from one another and shifted from the transmission time point of the noise determination purpose burst signal from the genuine transmission antenna.

3. The transmission control device according to claim 1, wherein
the first transmission control unit controls the genuine transmission antenna to transmit the noise determination purpose burst signal which has a different use purpose in addition to a determination of noise in the portable device, and
the second transmission control unit controls each antenna of the remaining antenna group to transmit the noise determination purpose burst signal, which has the different use purpose in addition to the determination of noise in the portable device, at the transmission time point, which is set different from one another and shifted from the transmission time point of the noise determination purpose burst signal from the genuine transmission antenna.

4. The transmission control device according to claim 1, wherein
the first transmission control unit is configured to switch the genuine transmission antenna that transmits the noise determination purpose burst signal among the plurality of antennas,
the second transmission control unit is configured to switch the remaining antenna group that transmits the noise determination purpose burst signals, and
in a case where the first transmission control unit switches the genuine transmission antenna that transmits the noise determination purpose burst signal and the second transmission control unit switches the remaining antenna group that transmits the noise determination purpose burst signals, a total quantity of the plurality of antennas that transmit the noise determination purpose burst signals is configured to be maintained.

5. The transmission control device according to claim 1, wherein
the second transmission control unit controls each antenna of the remaining antenna group, which includes remaining antennas of the plurality of antennas arranged at respective positions of the vehicle except the genuine transmission antenna, to transmit the noise determination purpose burst signal at the transmission time point, which is set different from one another and shifted from the transmission time point of the noise determination purpose burst signal from the genuine transmission antenna.

6. A portable device carried by a user, the portable device comprising:
a portable device reception unit driven by a transmission control device mounted on a vehicle and receiving signals, which are transmitted from a plurality of antennas arranged at respective positions of the vehicle to have different transmission ranges from one another, via a wireless communication with use of a carrier wave within the transmission ranges of the plurality of antennas;
a portable device transmission control unit configured to transmit a response signal that includes information enabling a detection of a position of the portable device relative to the vehicle in response to the portable device reception unit receiving a genuine code that activates the portable device; and
a portable device determination unit configured to determine (i) whether the genuine code and a noise determination purpose burst signal following the genuine code, which are transmitted from a genuine transmission antenna, are received, and (ii) whether the noise determination purpose burst signal, which is transmitted from each antenna of a remaining antenna group, is received at a transmission time point, which is set different from one another and shifted from a transmission time point of the noise determination purpose burst signal transmitted from the genuine transmission antenna,
wherein
the genuine transmission antenna is one of the plurality of antennas and the remaining antenna group includes remaining antennas of the plurality of antennas except the genuine transmission antenna,
the transmission ranges of the plurality of antennas including the genuine transmission antenna are set to not have a common area,
the noise determination purpose burst signal is used to determine a noise in the portable device,
the portable device determination unit controls the portable device transmission control unit to transmit the response signal in response to the portable device reception unit receiving the genuine code in a case where the noise determination purpose burst signals transmitted from partial of the plurality of antennas are received, and
the portable device determination unit forbids a transmission of the response signal although the portable device reception unit has received the genuine code in a case where the noise determination purpose burst signals transmitted from all of the plurality of antennas are received.

7. A vehicle system comprising:
a portable device carried by a user; and
a transmission control device, which is mounted on a vehicle and drives a plurality of antennas to detect a position of the portable device relative to the vehicle using a wireless communication between the portable device and the plurality of antennas, the plurality of antennas being arranged at respective positions of the vehicle to have different transmission ranges from one another,
wherein
the transmission control device includes:
  a first transmission control unit configured to control a genuine transmission antenna to transmit, with use of a carrier wave, a genuine code that activates the portable device and a noise determination purpose burst signal following the genuine code, and the genuine transmission antenna being one of the plurality of antennas and the portable device using the noise determination purpose burst signal to determine a noise; and
  a second transmission control unit configured to control each antenna of a remaining antenna group, which includes remaining antennas of the plurality of antennas except the genuine transmission antenna, to transmit the noise determination purpose burst signal at a transmission time point, which is set different from one another and shifted from a transmission time point of the noise determination purpose burst signal from the genuine transmission antenna, and the transmission ranges of the plurality of antennas which include the genuine transmission antenna being set to not have a common area,
the portable device includes:
  a portable device reception unit configured to receive signals transmitted from the plurality of antennas, via the wireless communication with use of the carrier wave, within the transmission ranges of the plurality of antennas;
  a portable device transmission control unit configured to transmit a response signal that includes information enabling a detection of the position of the portable device relative to the vehicle in response to the portable device reception unit receiving the genuine code; and
  a portable device determination unit configured to determine (i) whether the genuine code and the noise determination purpose burst signal following the genuine code, which are transmitted from the genuine transmission antenna, are received, and (ii) whether the noise determination purpose burst signal, which is transmitted from each antenna of the remaining antenna group, is received at the transmission time point, which is set different from one another and shifted from the transmission time point of the noise determination purpose burst signal transmitted from the genuine transmission antenna,
the portable device determination unit controls the portable device transmission control unit to transmit the response signal in response to the portable device reception unit receiving the genuine code in a case where the noise determination purpose burst signals transmitted from partial of the plurality of antennas are received, and
the portable device determination unit forbids a transmission of the response signal although the portable device reception unit has received the genuine code in a case where the noise determination purpose burst signals transmitted from all of the plurality of antennas are received.

8. A transmission control method executed by a transmission control device, which is mounted on a vehicle and drives a plurality of antennas to detect a position of a portable device relative to the vehicle using a wireless communication between the portable device and the plurality of antennas, the plurality of antennas being arranged at respective positions of the vehicle to have different transmission ranges from one another, and the portable device being carried by a user,
the transmission control method comprising:
  controlling a genuine transmission antenna to transmit, with use of a carrier wave, a genuine code that activates the portable device and a noise determination purpose burst signal following the genuine code, and the genuine transmission antenna being one of the plurality of antennas and the portable device using the noise determination purpose burst signal to determine a noise; and
  controlling each antenna of a remaining antenna group, which includes remaining antennas of the plurality of antennas except the genuine transmission antenna, to transmit the noise determination purpose burst signal at a transmission time point, which is set different from one another and shifted from a transmission time point of the noise determination purpose burst signal from the genuine transmission antenna, and the transmission ranges of the plurality of antennas which include the genuine transmission antenna being set to not have a common area.

9. A control method executed by a portable device carried by a user, the control method comprising:
  determining (i) whether a genuine code and a noise determination purpose burst signal following the genuine code, which are transmitted from a genuine transmission antenna, are received, and (ii) whether the noise determination purpose burst signal, which is transmitted from each antenna of a remaining antenna group, is received at a transmission time point, which is set different from one another and shifted from a transmission time point of the noise determination purpose burst signal transmitted from the genuine transmission antenna, the genuine transmission antenna being one of a plurality of antennas arranged at respective positions of a vehicle, the plurality of antennas being driven by a transmission control device mounted on the vehicle to have transmission ranges different from one another, the remaining antenna group including remaining antennas of the plurality of antennas except the genuine transmission antenna, the transmission ranges of the plurality of antennas which include the genuine transmission antenna being set to not have a common area, and the genuine code being used to activate the portable device and the noise determination purpose burst signal being used to determine a noise in the portable device;
  transmitting a response signal that includes information enabling a detection of a position of the portable device relative to the vehicle in response to a reception of the genuine code in a case where the noise determination purpose burst signals transmitted from partial of the plurality of antennas are received; and
  forbidding a transmission of the response signal although the portable device has received the genuine code in a case where the noise determination purpose burst signals transmitted from all of the plurality of antennas are received.

10. A computer readable non-transitory tangible medium storing a control program product controlling a computer to be implemented as a transmission control device, the transmission control device being mounted on a vehicle and driving a plurality of antennas to detect a position of a portable device relative to the vehicle using a wireless communication between the portable device and the plurality of antennas, the plurality of antennas being arranged at respective positions of the vehicle to have different transmission ranges from one another, and the portable device being carried by a user, the control program product comprising instructions that control the transmission control device to function as:

a first transmission control unit configured to control a genuine transmission antenna to transmit, with use of a carrier wave, a genuine code that activates the portable device and a noise determination purpose burst signal following the genuine code, and the genuine transmission antenna being one of the plurality of antennas and the portable device using the noise determination purpose burst signal to determine a noise; and a second transmission control unit configured to control each antenna of a remaining antenna group, which includes remaining antennas of the plurality of antennas except the genuine transmission antenna, to transmit the noise determination purpose burst signal at a transmission time point, which is set different from one another and shifted from a transmission time point of the noise determination purpose burst signal from the genuine transmission antenna, and the transmission ranges of the plurality of antennas which include the genuine transmission antenna being set to not have a common area.

11. A computer readable non-transitory tangible medium storing a control program product comprising instructions that control a computer to be implemented as:

a portable device determination unit of a portable device, the portable device determination unit determining (i) whether a genuine code and a noise determination purpose burst signal following the genuine code, which are transmitted from a genuine transmission antenna, are received, and (ii) whether the noise determination purpose burst signal, which is transmitted from each antenna of a remaining antenna group, is received at a transmission time point, which is set different from one another and shifted from a transmission time point of the noise determination purpose burst signal transmitted from the genuine transmission antenna, the genuine transmission antenna being one of a plurality of antennas arranged at respective positions of a vehicle, the plurality of antennas being driven by a transmission control device mounted on the vehicle to have different transmission ranges from one another, the remaining antenna group including remaining antennas of the plurality of antennas except the genuine transmission antenna, the transmission ranges of the plurality of antennas which include the genuine transmission antenna being set to not have a common area, and the genuine code being used to activate the portable device and the noise determination purpose burst signal being used to determine a noise in the portable device; and a portable device transmission control unit of the portable device, the portable device transmission control unit being configured to transmit a response signal that includes information enabling a detection of a position of the portable device relative to the vehicle in response to a reception of the genuine code in a case where the noise determination purpose burst signals transmitted from partial of the plurality of antennas are received, and the portable device transmission control unit further being configured to forbid a transmission of the response signal although the portable device has received the genuine code in a case where the noise determination purpose burst signals transmitted from all of the plurality of antennas are received.

* * * * *